United States Patent
Tsutsumi

(10) Patent No.: US 10,264,772 B2
(45) Date of Patent: Apr. 23, 2019

(54) LINE STOPPER FOR FISHING SPINNING REEL AND FISHING SPINNING REEL

(71) Applicant: GLOBERIDE, Inc., Tokyo (JP)

(72) Inventor: Wataru Tsutsumi, Tokyo (JP)

(73) Assignee: GLOBERIDE, INC., Tokyo (JP)

( * ) Notice: Subject to any disclaimer, the term of this patent is extended or adjusted under 35 U.S.C. 154(b) by 0 days.

(21) Appl. No.: 15/718,542

(22) Filed: Sep. 28, 2017

(65) Prior Publication Data

US 2018/0084769 A1    Mar. 29, 2018

(30) Foreign Application Priority Data

Sep. 29, 2016  (JP) .................... 2016-191651
Sep. 29, 2016  (JP) .................... 2016-191682
Sep. 30, 2016  (JP) .................... 2016-194806

(51) Int. Cl.
   *A01K 89/01*   (2006.01)
   *A01K 89/015*  (2006.01)

(52) U.S. Cl.
   CPC .... *A01K 89/01081* (2015.05); *A01K 89/0111* (2013.01); *A01K 89/0114* (2013.01); *A01K 89/0182* (2015.05); *A01K 89/01931* (2015.05)

(58) Field of Classification Search
   CPC ............................ A01K 89/01; A01K 89/0111
   See application file for complete search history.

(56) References Cited

U.S. PATENT DOCUMENTS

| | | | | |
|---|---|---|---|---|
| 2,958,973 A | * | 11/1960 | Le May | A01K 91/08 24/545 |
| 2,959,884 A | * | 11/1960 | Lemay | A01K 97/00 24/334 |
| 3,499,242 A | * | 3/1970 | Tucker, Sr. | A01K 87/00 43/25 |
| 4,316,588 A | * | 2/1982 | Walthall | B65H 49/32 242/129.62 |
| 4,765,083 A | * | 8/1988 | Wilkins | A01K 87/00 43/26 |
| 4,883,238 A | * | 11/1989 | Harder | A01K 89/016 242/317 |

(Continued)

FOREIGN PATENT DOCUMENTS

| | | |
|---|---|---|
| EP | 2829174 A1 | 1/2015 |
| JP | 55-121669 U | 8/1980 |

(Continued)

OTHER PUBLICATIONS

Extended European Search Report EP Application No. 17194189.1 dated Feb. 26, 2018.

*Primary Examiner* — Emmanuel M Marcelo

(74) *Attorney, Agent, or Firm* — Pillsbury Winthrop Shaw Pittman, LLP

(57) ABSTRACT

A line stopper for a fishing reel according to the discloser includes a line stopper member that includes a fishing line catching portion and a support shaft portion, and a supporting member that supports the line stopper member and fits in a through hole formed in a main body of the fishing reel. On one of the fishing line catching portion or the supporting member, a protrusion is provided at a left or right side or both the left and right sides of the support shaft portion in a width direction of the supporting member in a plan view where the fishing line catching portion and the supporting member overlap each other.

14 Claims, 41 Drawing Sheets

(56) References Cited

U.S. PATENT DOCUMENTS

| | | | | |
|---|---|---|---|---|
| 5,333,813 A * | 8/1994 | Hirano | A01K 89/00 | 242/322 |
| 6,408,563 B1 * | 6/2002 | Van Scoy | A01K 87/00 | 43/25.2 |
| 7,140,148 B1 * | 11/2006 | Williams, II | A01K 91/02 | 43/54.1 |
| 7,163,169 B1 * | 1/2007 | Rosseau | A01K 91/065 | 242/309 |
| 7,698,851 B1 * | 4/2010 | Donohoe | A01K 91/02 | 43/19 |
| 2003/0136866 A1 * | 7/2003 | Kitajima | A01K 89/01 | 242/307 |
| 2003/0136867 A1 * | 7/2003 | Kitajima | A01K 89/0111 | 242/310 |
| 2003/0140912 A1 * | 7/2003 | LaSee | F41B 5/1488 | 124/86 |
| 2003/0213862 A1 * | 11/2003 | Perrin | A01K 89/0111 | 242/322 |
| 2008/0203207 A1 * | 8/2008 | Krauland | A01K 89/003 | 242/287 |
| 2011/0095894 A1 * | 4/2011 | Gibson | A01K 97/125 | 340/573.2 |
| 2015/0181854 A1 * | 7/2015 | Vannieuwenhoven | A01K 97/10 | 43/21.2 |
| 2015/0264907 A1 * | 9/2015 | Dunlop | A01K 89/0108 | 124/23.1 |

FOREIGN PATENT DOCUMENTS

| | | |
|---|---|---|
| JP | 55-174279 U | 12/1980 |
| JP | 60-38575 U | 3/1985 |
| JP | 5-13166 U | 2/1993 |
| JP | 10-42757 A | 2/1998 |
| JP | 2000262191 A * | 9/2000 |
| JP | 2001-269094 A | 10/2001 |
| JP | 2003-284459 A | 10/2003 |

* cited by examiner

LINE STOPPER FOR FISHING SPINNING REEL AND FISHING SPINNING REEL

CROSS-REFERENCE TO RELATED APPLICATIONS

This application is based on and claims the benefit of priority from Japanese Patent Application Serial No. 2016-191651, 2016-191682 (filed on Sep. 29, 2016), and 2016-194806 (filed on Sep. 30, 2016) the contents of which are hereby incorporated by reference in its entirety.

The present discloser relates to a line stopper for a fishing reel and a fishing spinning reel thereof.

BACKGROUND

Fishing reels may have a line stopper on which a fishing line is locked to prevent the fishing line wound around a spool from becoming loose. For instance, a line stopper for a fishing spinning reel may include a line stopper member disposed on an outer peripheral surface of a skirt portion of a spool. The line stopper member includes a support shaft portion that extends radially outward from the outer peripheral surface of the skirt portion and a fishing line catching portion provided at the tip of the support shaft portion. A fishing line may be wound around the support shaft portion or clamped between the fishing line catching portion and the skirt portion, whereby the fishing line can be locked.

Japanese Utility Model Application Publication Hei. 5-13166 ("the '166 Publication") describes a line stopper having a supporting member that is made of resin and disposed between the line stopper member and the skirt portion (see FIG. 1 of the '166 Publication). When a fishing line is engaged with the line stopper member, the fishing line does not contact the metal skirt portion, and thereby the fishing line is prevented from being scratched by the metal portion.

However when the above-described supporting member is provided, the line stopper member is disposed radially outside and there is a possibility that the fishing line could get caught. Thus, in a modification example of the '166 Publication, a recess for accommodating the supporting member is provided in the outer peripheral surface of the skirt portion (see FIG. 9 of the '166 Publication). A line stopper described in Japanese Patent Application Publication No. 2001-269094 ("the '094 Publication") has a through hole for accommodating the supporting member in the skirt portion.

Since the line stopper of the '094 Publication has the through hole, there is no bottom wall that supports the supporting member from the radially inward side. Thus, the supporting member has a support shaft portion that extends to the skirt portion (the main body) and is provided for the supporting member. The support shaft portion of the line stopper member and the support shaft portion of the supporting member are disposed such that they are overlapped from each other in the spool shaft direction and fixed by a screw (see FIG. 7 of the '094 Publication).

Japanese Utility Model Application Publication Sho. 55-121669 ("the '669 Publication") describes a line stopper for a fishing spinning reel is configured to have a metal hook that protrudes to the side of the skirt portion. In the line stopper of the '669 Publication, a fishing line is wrapped around the axis of the metal hook so as to lock the fishing line.

Japanese Patent Application Publication No. 2003-284459 ("the '459 Publication") describes a line stopper for a fishing spinning reel is configured to have a fishing line catching portion that extend along the outer peripheral surface of the skirt portion. In the line stopper of the '459 Publication, a tip of a fishing line is clamped between the fishing line catching portion and the outer peripheral surface of the skirt portion so as to lock the fishing line. The fishing line catching portion is configured to be biased toward the skirt portion by a spring or the elasticity of the fishing line catching portion itself. By biasing, the fishing line is prevented from coming off from the fishing line catching portion.

However, according to the modification example of the '166 Publication, a wall of the skirt portion in the vicinity of the recess has a thickness which is the sum of the thickness of the recess for accommodating the supporting member and the thickness of the bottom wall for supporting the supporting member accommodated in the recess. Therefore the thickness of the wall is relatively large, resulting in a large weight of the spool. For the case where the through hole is provided in the skirt portion such as the line stopper of the '094 Publication, unless the through hole is closed, the line stopper member tends to deform radially inward and therefore it is difficult to lock the fishing line thereon. Moreover there is a possibility that foreign substances and a fishing line enter inside the skirt portion. For the above-stated reasons, it is preferable that the through hole be formed in the skirt portion (the main body) and the supporting member is configured to close the through hole.

Furthermore, when the support shaft portion of the line stopper member and the support shaft portion of the supporting member overlap in the spool shaft direction such as the fixing structure described in the '094 Publication, there is a possibility that the spool contacts a front portion of a rotor when the spool reciprocates. When trying to avoid contact with the front portion of the rotor, it may increase the size of the skirt portion and restrict the shape, dimensions and the like of the spool and the rotor. For this reason, it is desired to provide a structure that can be easily fixed without forming the support shaft on the supporting member.

Further, the line stopper for the fishing spinning reel of the '669 Publication locks a fishing line by wrapping the line around the axis of the metal hook. In such a structure, when the fishing line is hard and thick, there is a risk that the fishing line comes off from the metal hook by the tension of the fishing line itself. Furthermore, in the line stopper for the spinning reel described in the '459 Publication if a fishing line is engaged with the metal hook for a long time, there is a possibility that the fishing line gets creased. Once the fishing line is creased, it may cause various troubles such as degradation of a fishing-line releasing capability, tangling and breakage of the fishing line.

Further, in the line stopper for a fishing spinning reel described in the '459 Publication, a fishing line is engaged at a part of the fishing line catching portion situated distant from a fishing line winding body (a part of the fishing line catching portion facing away from the fishing line winding body). Accordingly, in the line stopper for a fishing spinning reel described in the '459 Publication, to engage and lock a fishing line, it was necessary to temporarily move the fishing line to a position distant from the fishing line winding body and then to advance the fishing line to a locking position between the fishing line catching portion and the outer peripheral surface of the skirt portion. Thus, there are a number of actions required to lock the fishing line, it is complicated and it is not possible to finish the actions quickly.

SUMMARY

The present disclosure has been made in view of the above drawbacks, and one object of the disclosure is to provide a line stopper for a fishing reel that can prevent coming off of a fishing line after locked while the fishing line is prevented from getting creased, and that can easily and swiftly lock the fishing line thereon with a smaller number of actions.

Another object of the disclosure is to provide a fishing reel on which a line stopper for the fishing reel can be easily fixed by making a through hole in a spool or a main body of the fishing reel and subsequently fitting a part of the line stopper in the through hole.

In view of the above challenges, provided is a line stopper installed in a fishing reel. The line stopper includes a fishing line catching portion and a supporting member disposed under the fishing line catching portion to lock a fishing line between the fishing line catching portion and the supporting member. The fishing line catching portion has a support shaft portion for connecting the fishing line catching portion with the supporting member. On one of the fishing line catching portion or the supporting member, a protrusion is provided at a left or right side or both the left and right sides of the support shaft portion in a width direction of the supporting member in a plan view where the fishing line catching portion and the supporting member overlap each other.

Also provided is a fishing spinning reel in which the above-described line stopper is installed. In the fishing spinning reel, the supporting member is fitted in a through hole formed in a spool of the spinning reel.

Also provided is a double-bearing reel in which the above-described line stopper is installed. In the double-bearing spinning reel, the supporting member is fitted in a through hole formed in a main body that supports a spool of the double-bearing reel.

According to the features of the discloser, not a recess but a through hole is formed in a spool or a reel body of a fishing reel and the line stopper is fitted in the through hole. Therefore a wall portion in the vicinity of the recess does not become thick. Moreover, since the supporting member of the line stopper closes the through hole, it is possible to prevent foreign substances from entering inside the spool or the main body.

Furthermore, according to the features of the disclosure, it is possible to prevent a fishing line from coming off after clamped and to prevent the fishing line from being creased. In addition, it is possible to clamp the fishing line easily and quickly with less number of the actions.

27b is a plan view of a fourth step where a pair of rail portions are inserted into a pair of engaging portions as viewed from above.

Figure 28:
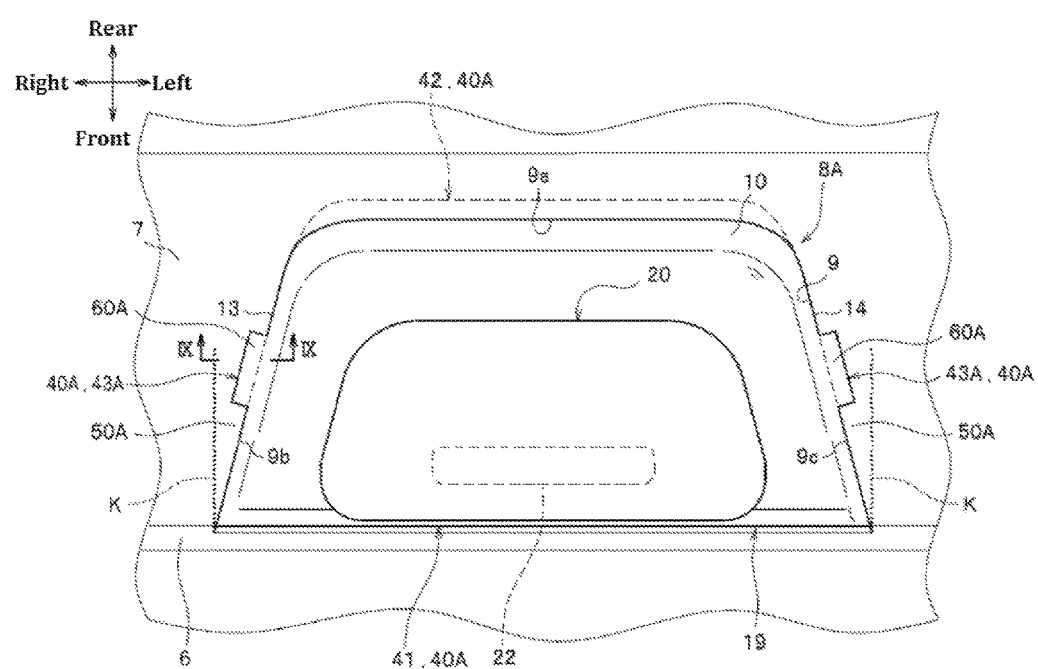

FIG. 28 is a plan view of a line stopper according to a sixth embodiment as viewed from above.

Figure 29:
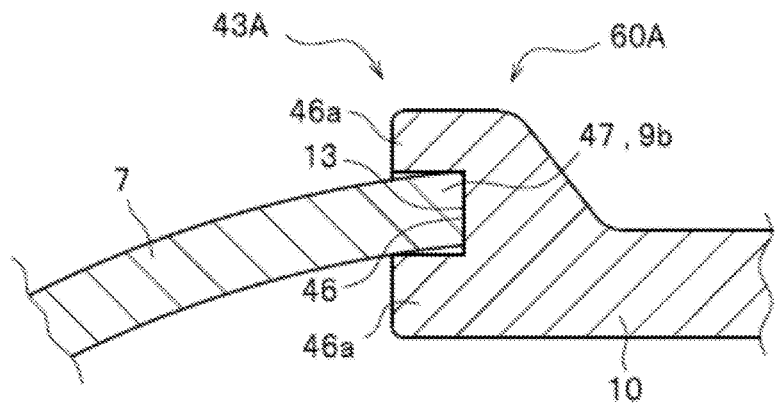

FIG. 29 is a sectional view along the line IX-IX of FIG. 28.

Figure 30:
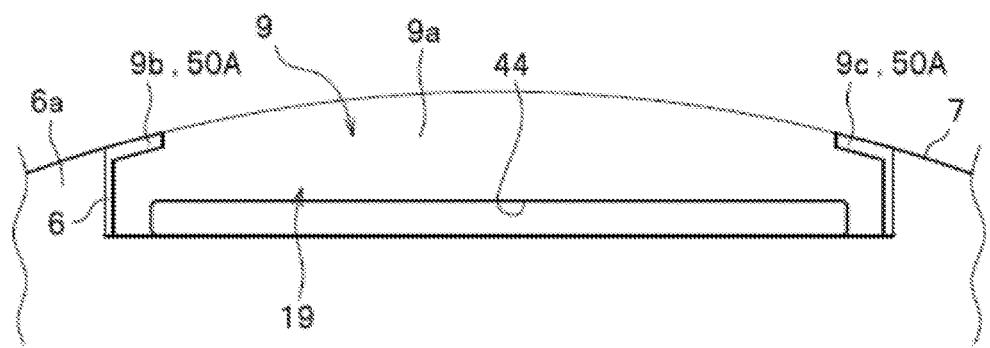

FIG. 30 is a front view of the skirt portion in a state where the supporting member and the line stopper member are removed as viewed from the front.

Figure 31:
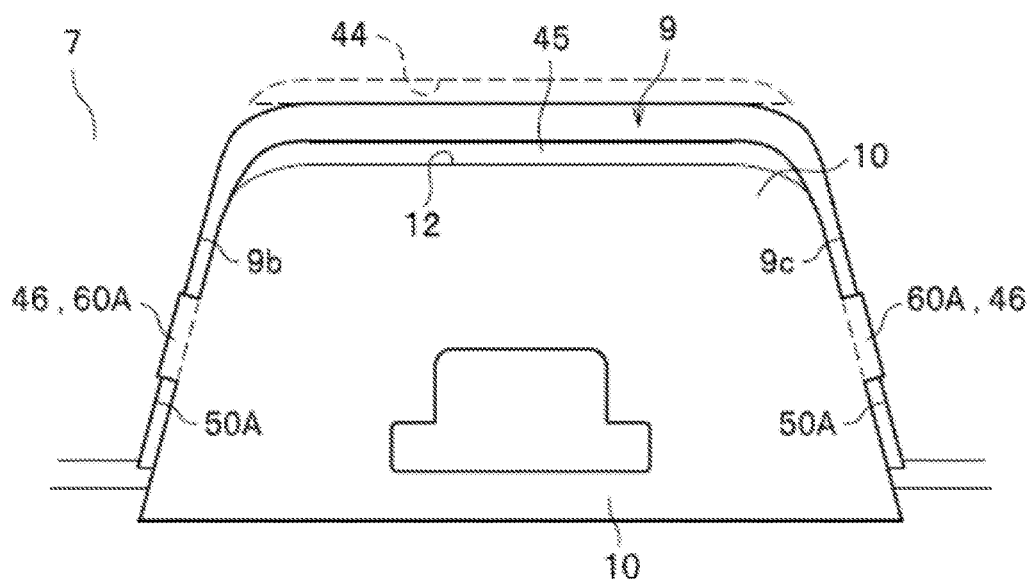

FIG. 31 is a plan view of a fourth step of the attachment process of the supporting member where a pair of rail portions are inserted into a pair of engaging portions as viewed from above.

Figure 32A:
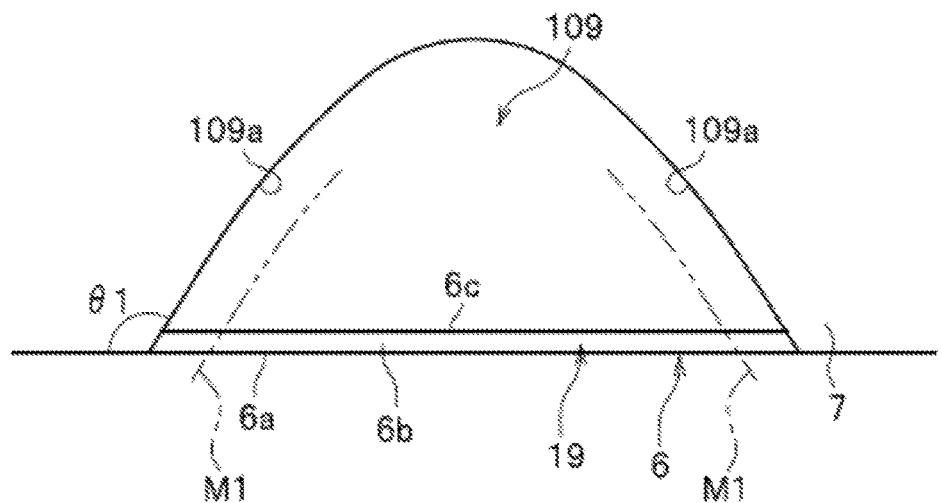
Figure 32B:
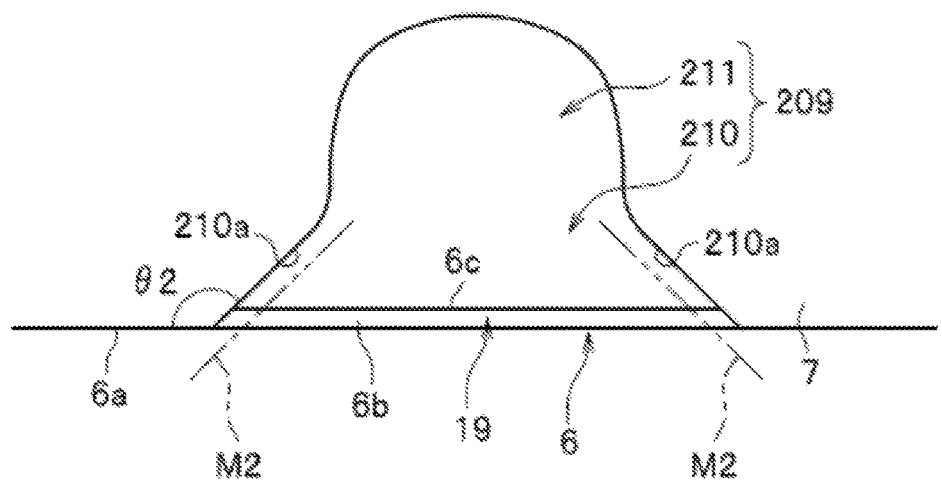

FIG. 32a is a plan view of a through hole according to a first modification example as viewed from the radially outside, and FIG. 32b is a plan view of a through hole according to a second modification example as viewed from the radially outside.

DESCRIPTION OF THE EMBODIMENTS

A line stopper according to the first embodiment of the disclosure and a fishing spinning reel to which the line stopper is applied will be now described with reference to the accompanying drawings. As used herein, "front and rear" and "upper and lower" directions refer to the directions shown in FIG. 1, and "left and right" directions refer to the directions shown in FIG. 3. More specifically, the front-rear direction refers to the longitudinal (height) direction of a line stopper that is formed in a trapezoidal shape in a plan view, the upper-lower direction refers to the thickness direction of the line stopper, and the left-right direction refers to the length (width) direction of the line stopper.

Figure 1A:
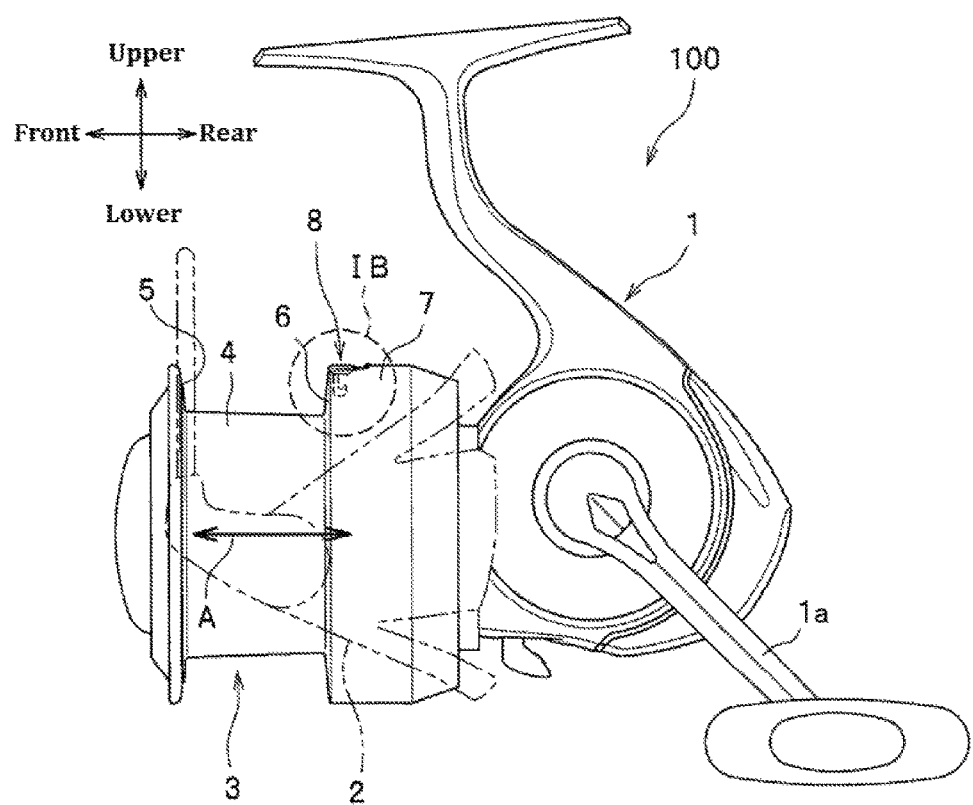
FIG. 1a is a side view of a fishing spinning reel according to a first embodiment showing the entire configuration.

Referring to FIG. 1a, a fishing spinning reel 100 may include a reel body 1 to which a handle 1a is attached, a rotor 2 that is rotated by a winding operation of the handle 1a, and a spool 3 that reciprocates in the front-rear direction in accordance with the winding operation.

Although not shown in the drawings, the reel body 1 may further include a spool shaft that extends toward the front and has a spool 3 at its front end, and a heretofore known oscillate mechanism. When the handle 1a is operated to wind up a fishing line, the oscillate mechanism reciprocates the spool shaft, thereby the spool 3 attached to the spool shaft reciprocates (see the arrow A in FIG. 1a). A heretofore known drag mechanism may be interposed between the spool shaft and the spool 3, and when a force greater than the drag force acts on the fishing line, the spool 3 rotates around the spool shaft.

Figure 1B:
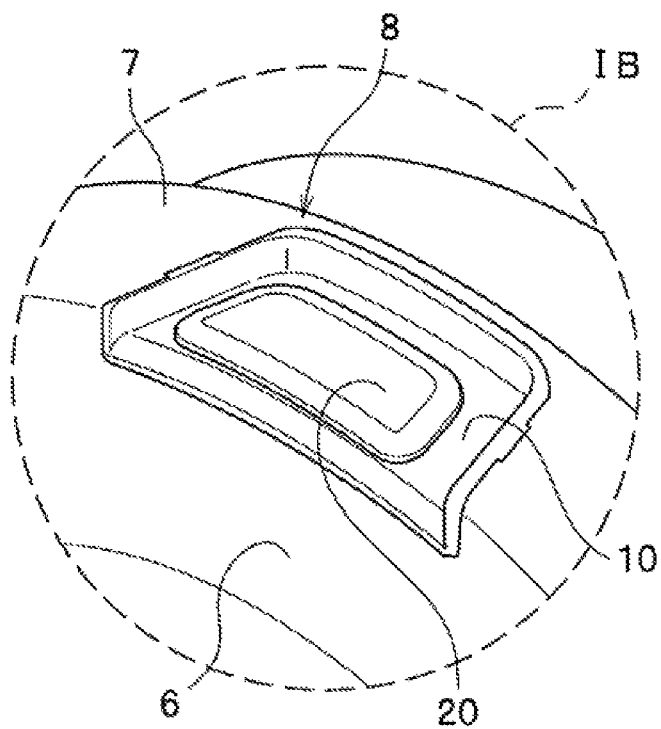
FIG. 1b is a perspective view of the part surrounded by a broken line IB in FIG. 1a as viewed from the upper side of the left front of the part.

The spool 3 may include a cylindrical fishing line winding body 4 around which a fishing line is wound, a ring-shaped front flange 5 rising radially outward from the front end of the fishing line winding body 4, and a ring-shaped rear flange 6 rising radially outward from the rear end of the fishing line winding body 4, and a substantially cylindrical skirt portion 7 extending rearward from the rear flange 6. Referring to FIGS. 1a and 1b, a line stopper 8 may be provided on the front side of the outer peripheral portion of the skirt portion 7. Further, the line stopper 8 of the first embodiment may be situated on the upper side of the outer peripheral portion of the skirt portion 7. Since the line stopper 8 is displaced in the circumferential direction in accordance with rotation of the spool 3, the line stopper 8 can be located on the lower side of the outer peripheral portion of the skirt portion 7 at one time and on the other side at other time. Hereinafter, the structure of the line stopper 8 will be described by citing a case where it is located on the upper side of the outer peripheral portion of the skirt portion 7.

Figure 2:
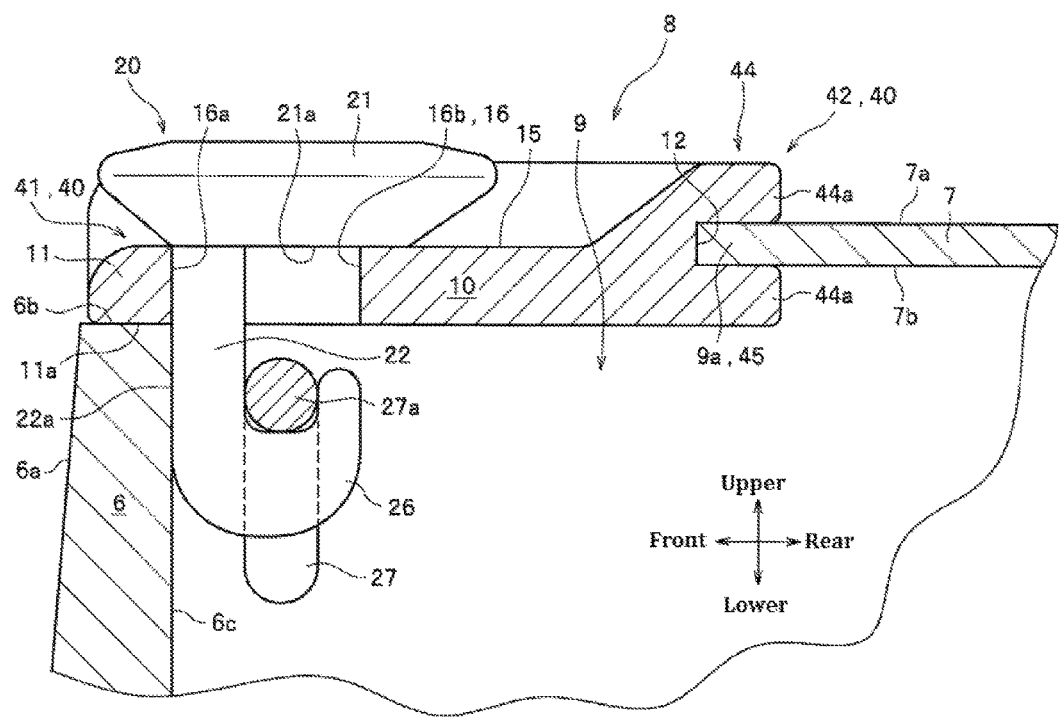
FIG. 2 is a cross-sectional view of a line stopper.
Figure 3:
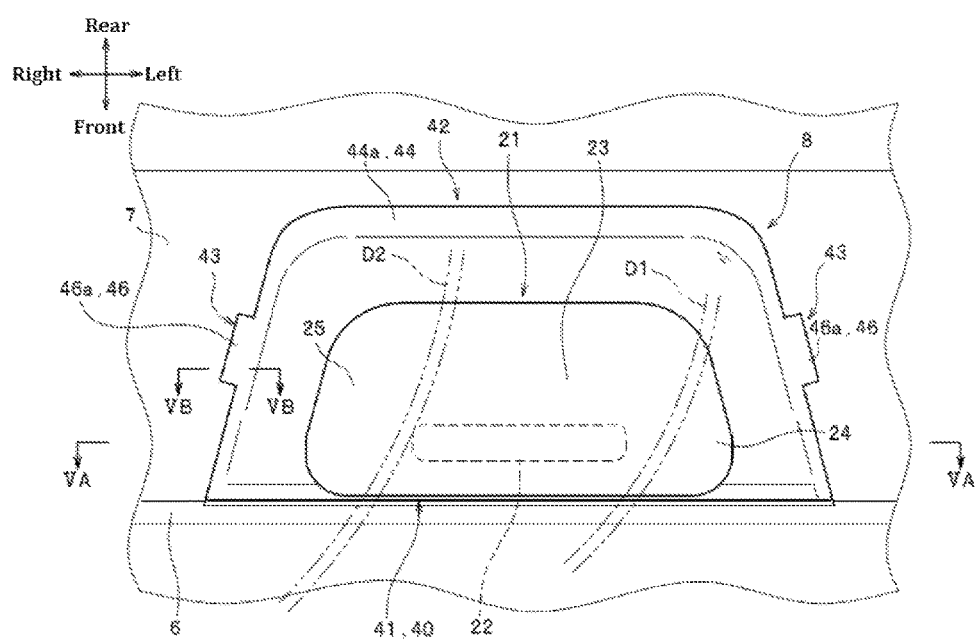
FIG. 3 is a plan view of the line stopper as viewed from above.

Referring to FIGS. 2 and 3, the line stopper 8 may include a through hole 9 that penetrates the skirt portion 7, a supporting member 10 that fits in the through hole 9, and a line stopper member 20 on which a support shaft portion 22 penetrating the front portion (one end portion) of the supporting member 10 is formed. The line stopper 8 may further include an engaging member 27 for preventing the line stopper member 20 from separating from the skirt portion 7, and a restricting portion 40 that restricts displacement of the supporting member 10 in the penetrating direction of the through hole 9 (the upper-lower direction).

Through-hole

Figure 4A:
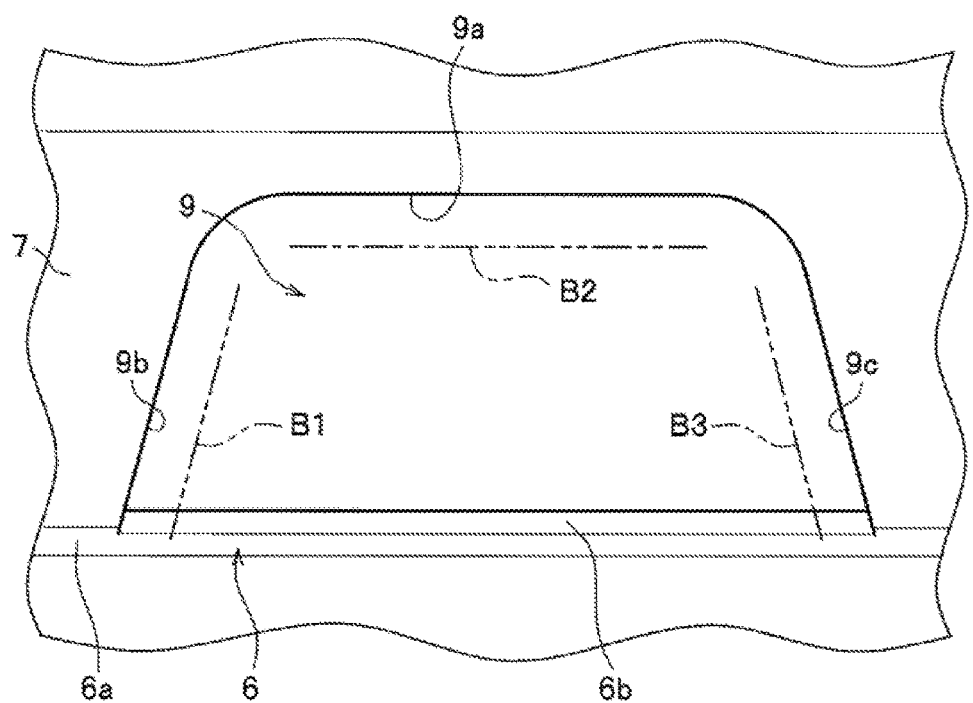
FIG. 4a is a plan view of the line stopper in which a supporting member and the like are detached from a skirt portion as viewed from above.

The through hole 9 may penetrate the upper side of the outer peripheral portion of the skirt portion 7 in the radial direction. Accordingly, the extending direction (penetration direction) of the through hole 9 is along the upper-lower direction. Referring to FIG. 4a, the width of the through hole 9 in the left-right direction (circumferential direction) may gradually narrow toward the rear. Thus, the opening of the through hole 9 has a substantially trapezoidal shape.

Here, the through hole 9 of the embodiment may be formed by cutting the front portion of the cylindrical skirt portion 7 into a substantially C-shape (see broken lines B1, B2, and B3) at the time of manufacture and removing substantially C-shape portion. The peripheral edge portion (the cut end of the skirt portion 7) of the through hole 9 may have a rear edge portion 9a extending in the right-left direction (circumferential direction) to form the rear edge of the through hole 9, a right edge portion 9b extending forward from the right end of the rear edge portion 9a to form the right edge of the through hole 9, and a left edge portion 9c extending forward from the left end of the rear edge portion 9a to form the left edge of the through hole 9.

To form the through hole 9, cutting is performed from the front surface 6a of the rear flange 6 toward the skirt portion 7 situated therebehind so that a part of the rear flange 6 is cut out. Consequently, a recessed surface (hereunder referred to as an "abutting surface 6b") dented inward in the radial direction compared to other portions may be formed in the outer periphery of the rear flange 6 (see FIG. 2).

Supporting Member

Figure 4B:
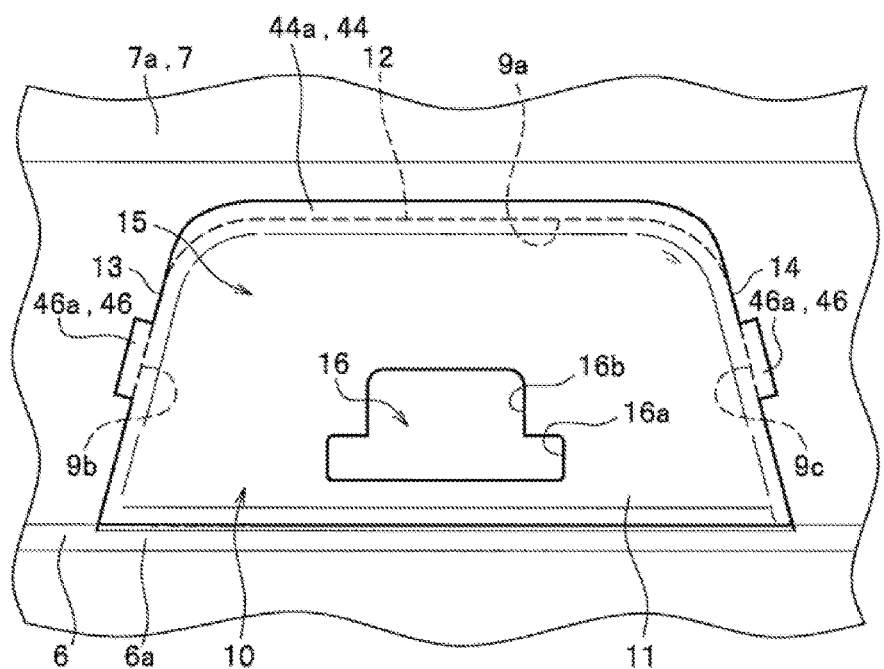
FIG. 4b is a plan view of the line stopper in which only the supporting member is attached to the skirt portion as viewed from above.

The supporting member 10 may be a resin member that supports the line stopper member 20, fits in the through hole 9, and has a flat plate shape. Referring to FIG. 4b, the outer shape of the supporting member 10 may correspond to the through hole 9 and may be formed in a substantially trapezoidal shape. Accordingly a rear end surface 12 of the supporting member 10 contacts the rear edge portion 9a of the through hole (see FIG. 2). A right end surface 13 of the supporting member 10 contacts the right edge portion 9b of the through hole (see FIG. 5a). A left end surface 14 of the supporting member 10 contacts the left edge portion 9c of the through hole (see FIG. 5a). As described above, the space between the supporting member 10 and the periphery of the through hole 9 is sealed.

The width of the supporting member 10 in the right-left direction before being mounted in the through hole 9 may be slightly larger than the width of the through hole 9 in the right-left direction. Therefore the supporting member 10 may be mounted such that the right end surface 13 and the left end surface 14 of the supporting member 10 are press-fitted with the right edge portion 9b and the left edge portion 9c of the through hole 9 (see the arrow C in FIG. 5a). In the above-described way, a gap is less likely to be generated between the right end surface 13, the left end surface 14 of the supporting member 10 and the periphery (the right edge portion 9b, the left edge portion 9c) of the through hole 9, resulting in a higher sealing performance.

Referring to FIG. 2, a lower surface 11a of a front portion 11 of the supporting member 10 may contact the abutting surface 6b of the rear flange 6. In this way, the space between the supporting member 10 and the rear flange 6 is sealed.

Referring again to FIG. 2, the central portion of the upper surface of the supporting member 10 may have a concave surface 15 recessed downward. Therefore, a fishing line catching portion 21 (described later) of the line stopper member 20 is positioned radially inward compared to a case where the concave surface 15 is not provided. The concave surface 15 may be formed to extend to the front end of the supporting member 10. In this way, the fishing line that is wound around the fishing line winding body 4 can be easily laid on the concave surface 15.

Referring to FIG. 4b, an opening 16 having a substantially T shape in a plan view may be formed in the concave surface 15. The opening 16 is a hole for inserting a support shaft portion 22 and the like therein when the line stopper member 20 is attached to the skirt portion 7. The opening 16 may include a front opening portion 16a that is situated on the front side and has a longer width in the right-left direction, and a rear opening portion 16b that is situated on the rear side and has a smaller width in the right-left direction. The support shaft portion 22 (see FIG. 2) of the line stopper member 20 may be inserted through the front opening portion 16a, and a bent portion 26 (described later, see FIG. 2) of the line stopper member 20 may be passed through the rear opening portion 16b.

Line Stopper Member

Referring again to FIG. 2, the line stopper member 20 may include a fishing line catching portion 21 disposed on the supporting member 10 (radially outer side), the support shaft portion 22 extending downward (radially inner side) from the fishing line catching portion 21, and a substantially U-shaped bent portion 26 bent upward from the lower end of the support shaft portion 22.

The fishing line catching portion 21 is for clamping the fishing line between the catching portion and the concave surface 15 of the supporting member 10, and a lower surface 21a of the fishing line catching portion 21 may contact the concave surface 15. Referring to FIG. 3, the fishing line catching portion 21 may have a rectangular shape in a plan view. The fishing line catching portion 21 may include a base portion 23 to which the support shaft portion 22 is connected, a left clamping portion 24 extending leftward from the base portion 23, and a right clamping portion 25 extending rightward from the base portion 23. The fishing line catching portion 21 may be formed relatively long in the right-left direction. A fishing line may be clamped between the left clamping portion 24 and the concave surface 15 (see D1 in FIG. 3), or between the right clamping portion 25 and the concave surface 15 (see D2 in FIG. 3).

The clamping portion (the left clamping portion 24 and the right clamping portion 25) according to the embodiment extends in the right-left direction with respect to the base portion 23, whereas a conventional clamping portion extends toward the rear side with respect to the base portion. Therefore, according to the embodiment, the length of the fishing line catching portion 21 in the front-rear direction is shorter than that of the conventional fishing line catching portion. Consequently, the length of the line stopper 8 including the supporting member 10 in the front-rear direction is shorter than that of the conventional line stopper, and the length of the skirt portion 7 in the front-rear direction is also shorter than the conventional skirt portion.

Referring to FIG. 2, the support shaft portion 22 may penetrate the front opening portion 16a situated on the front end side of the supporting member 10, and extend into the skirt portion 7. The front surface 22a of the support shaft portion 22 may abut on a rear surface 6c of the rear flange 6. In this way, the line stopper member 20 is inhibited from moving toward the front.

Figure 5A:
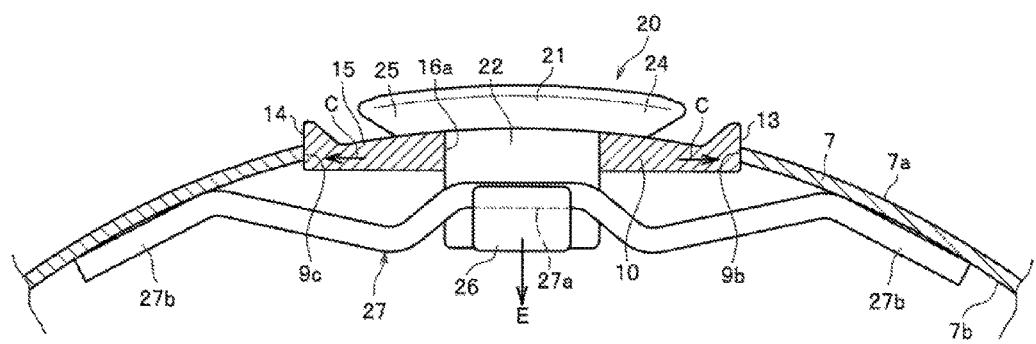
FIG. 5a is a fragmentary sectional view taken along the line VA-VA of FIG. 3

Referring to FIG. 5a, the support shaft portion 22 may be formed long in the right-left direction and have a plate-like shape. The length of the support shaft portion 22 in the left-right direction may be same as that of the front opening portion 16a. In this way, the support shaft portion 22 that passes through the front opening portion 16a of the supporting member 10 is inhibited from moving toward the rear opening portion 16b (see FIG. 4b), in other words, the supporting member 10 is prevented from moving toward the front.

Engaging Member

Referring to FIG. 5a, the engaging member 27 may be a wire (spring member) that is elastically deformable and extends in the right-left direction. The engaging member 27 may be attached such that it biases the bent portion 26 of the support shaft portion 22 downward (radially inward). More specifically, both end portions 27b, 27b of the engaging member 27 are brought into contact with an inner peripheral surface 7b of the skirt portion 7, and a central portion 27a of the engaging member 27 is caught by the bent portion 26 to bias the line stopper member 20 downward (see the arrow E) all the time. In this way, a fishing line inserted between the left clamping portion 24 (or the right clamping portion 25) of the fishing line catching portion 21 and the concave surface 15 of the supporting member 10 is strongly clamped by the elastic force of the engaging member 27.

Restricting Portion

Referring to FIG. 3, the restricting portion 40 may include a first restricting portion 41 that prevents the front side of the supporting member 10 from moving in the upper-lower direction that is the penetrating direction, and a second restricting portion 41 that prevents the rear side of the supporting member 10 from moving in the upper-lower direction, and a third restricting portion 43 that prevents the lateral sides of the supporting member 10 from moving in the upper-lower direction.

First Restricting Portion

Referring to FIG. 2, the first restricting portion 41 may include an abutting surface 6b of the rear flange 6 and the fishing line catching portion 21 of the fishing line stopper member 20. The abutting surface 6b contacts the lower surface 11a of the front portion 11 of the supporting member 10, and prevents the supporting member 10 from moving downward (radially inside). The fishing line catching portion 21 contacts the upper surface (concave surface 15) of the supporting member 10 on the front side, and prevents the supporting member 10 from moving upward (radially outside). As described above, the front portion 11 of the supporting member 10 is prevented from moving in the upper-lower direction (radial direction) by the first restricting portion 41.

Further, since the fishing line catching portion 21 is constantly biased downward (radially inward) by the engaging member 27, the fishing line catching portion 21 abuts on the front portion 11 of the supporting member 10 downward. In this way, the front portion 11 of the supporting member 10 is strongly clamped in the upper-lower direction by the abutting surface 6b and the fishing line stopper member 20.

Therefore, the fixation strength with which the supporting member 10 is fixed to the spool 3 is very high. Moreover, since the fishing line catching portion 21 presses the supporting member 10 downward, a gap is hardly formed between the supporting member 10 and the abutting surface 6b, resulting in a high sealing property.

Second Restricting Portion

The second restricting portion 42 may include a concave portion 44 formed in the rear end portion of the supporting member 10 and a convex portion 45 formed in the skirt portion 7. In the embodiment, the concave portion 44 is formed by providing protrusions 44a, 44a protruding rearward at the upper end and the lower end of the rear end surface 12 respectively. The convex portion 45 may be the rear edge portion 9a of the through hole 9 and fitted into the concave portion 44. Thus the supporting member 10 and the skirt portion 7 are engaged with each other in the upper-lower direction. As described above, displacement of the rear portion of the supporting member 10 in the upper-lower direction (radial direction) is restricted by the second restricting portion 42. Referring to FIG. 4b, the concave portion 44 may extend in the left-right direction (circumferential direction) in the rear end surface 12. Therefore foreign substances hardly pass between the rear end surface 12 of the supporting member 10 and the rear edge portion 9a of the through hole 9, resulting in a high sealing property.

Third Restricting Portion

Figure 5B:
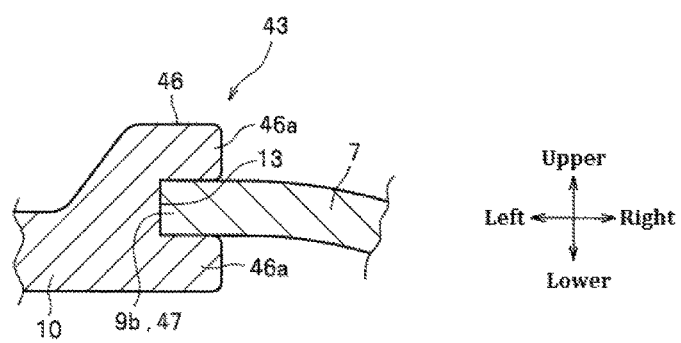
FIG. 5b is a fragmentary sectional view taken along the line VB-VB of FIG. 3.

Referring to FIG. 5b, the third regulating portion 43 may include a concave portion 46 formed in the right end surface 13 and the left end surface 14 of the supporting member 10 respectively, and a convex portion 47 formed in the skirt portion 7. The concave portion 46 may be formed by providing protrusions 46a, 46 a protruding outward in the circumferential direction at the upper end and the lower end of the right end surface 13 respectively. The convex portion 47 may be the right edge portion 9b or the left edge portion 9c of the through hole 9 and fitted into the concave portion 46. Thus the supporting member 10 and the skirt portion 7 are engaged with each other in the upper-lower direction. As described above, displacement of the right and left sides of the supporting member 10 in the upper-lower direction (radial direction) is restricted by the third restricting portion 43. Referring to FIG. 4b, the concave portion 46 may be formed only in a part of the right end surface 13 and the left end surface 14 of the supporting member 10 in the front-rear direction.

According to the second restricting portion 42 and the third restricting portion 43 described above, the concave portions 44, 46 are formed in the end surfaces of the supporting member 10, and the dimension of the supporting member 10 is larger than the dimension of the through hole 9 in a plan view. As one of methods of attaching the supporting member 10, firstly, the supporting member 10 is bent (deformed) from the right-left direction, inserted into the through hole 9 from above the through hole 9, and release the deformation to engage the left and right concave portions 46, 46 with the right edge portion 9b and the left edge portion 9c of the through hole 9 respectively, thereafter the supporting member 10 is moved backward to engage the concave portion 44 with the rear edge portion 9a of the through hole 9. As another method of attaching the supporting member 10, the supporting member 10 is firstly provided anterior to the front surface 6a of the rear flange 6. Subsequently the rear end portion of the lower surface of the supporting member 10 is placed on the front surface 6a of the rear flange 6 and then slidably moved backward. According to the latter method, during the sliding movement, the right edge portion 9b and the left edge portion 9c of the through hole 9 are inserted into the left and right concave portions 46, 46, and finally the rear edge portion 9a is inserted into the concave portion 44. Alternatively, since the supporting member 10 may be made of resin which is elastically deformable, the supporting member 10 may be pushed into the through hole 9 as the concave portions 44, 46 are deformed.

As described above, according to the feature of the embodiment, since the supporting member 10 fits in the through hole 9 and the sealing property between the supporting member 10 and the peripheral portion of the through hole 9 is high, it is prevented that foreign substances from entering inside the skirt portion 7 (main body).

Moreover, according to the embodiment, the first restricting portion 41 is composed of the abutting surface 6b and the line stopper member 20. The second restricting portion 42 and the third restricting portion 43 are composed of the concave portions 44, 46 and the convex portions 45, 47. Therefore, the supporting member 10 can be fixed to the spool 3 with a simple mechanism.

The invention is not limited to the examples in the above description of the first embodiment. For example, although the restricting portion 40 of the above-described embodiment includes the third regulating portion 43, the third regulating portion 43 may be omitted. As long as the first restricting portion 41 and the second restricting portion 42 are provided, the supporting member 10 may be sufficiently fixed to the skirt portion 7. Further, in the above embodiment, the line stopper 8 disposed on the fishing spinning reel has been described. Alternatively the line stopper may be applied to a side plate of a double bearing fishing reel (bait reel).

The engaging member 27 in the above-described embodiment is made of an elastically deformable wire (spring member). Alternatively, referring to FIG. 6, an engaging member 27A may be a pin that penetrates a support shaft portion 22A and is stuck in the rear surface 6c of a rear flange 6A. In such a case where the pin is used, when a fishing line is clamped between the supporting member 10 and the fishing line catching portion 21, the left clamping portion 24 or the right clamping portion 25 is deformed instead of the spring member.

Figure 6:
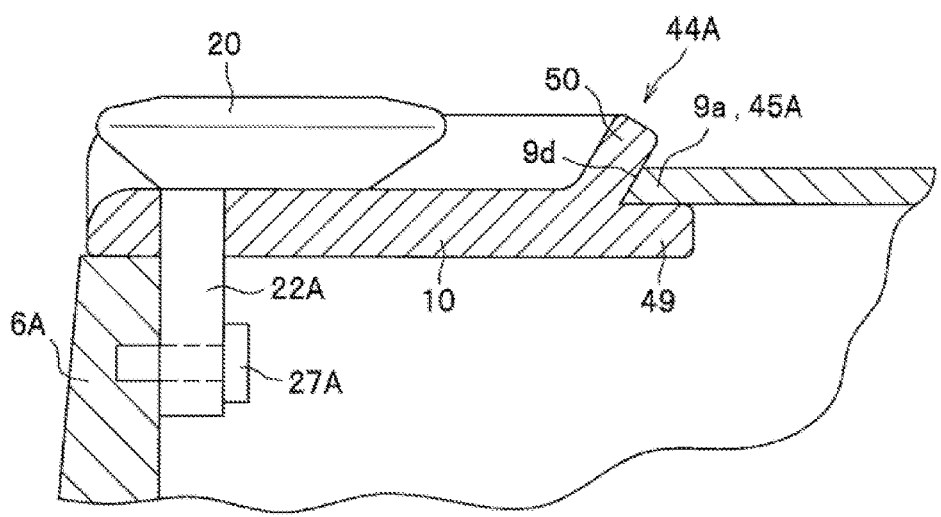
FIG. 6 is a cross-sectional view of a line stopper according to a first modification example.

In the above embodiment, the section of the rear edge portion 9a of the through hole 9 extends in the thickness direction (radial direction) of the wall portion that serves as the skirt portion 7 (see FIG. 2). However, the invention is not limited to this. For example, as shown in FIG. 6, a cut end 9d of the rear edge portion 9a of the through hole 9 may be formed at an angle with respect to the wall portion that serves as the skirt portion 7. In this way, burrs are less likely to occur at the rear edge portion 9a and therefore it is preferable. In the case where the cut end 9d of the rear edge portion 9a of the through hole 9 is oblique, a concave portion 44A is not a concave portion having a C-shaped cross section but a substantially V-shaped concave portion that has a first protrusion 49 abutting against the lower surface of the rear edge portion 9a and a second protrusion 50 abutting against the cut end 9d of the rear edge portion.

Figure 7:
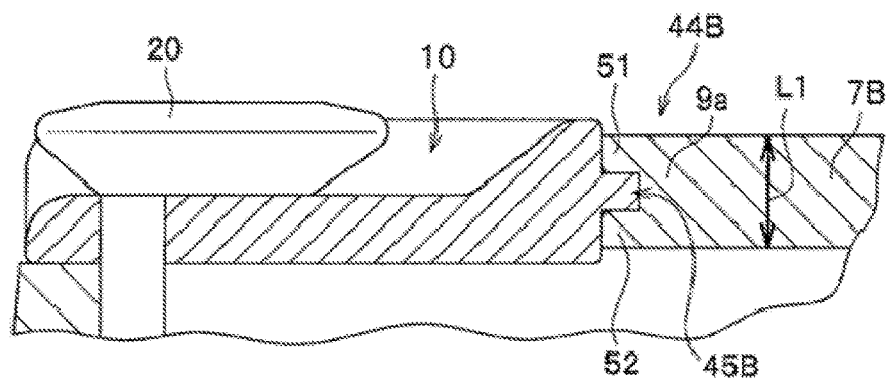
FIG. 7 is a cross-sectional view of a line stopper according to a second modification example.
Figure 8:
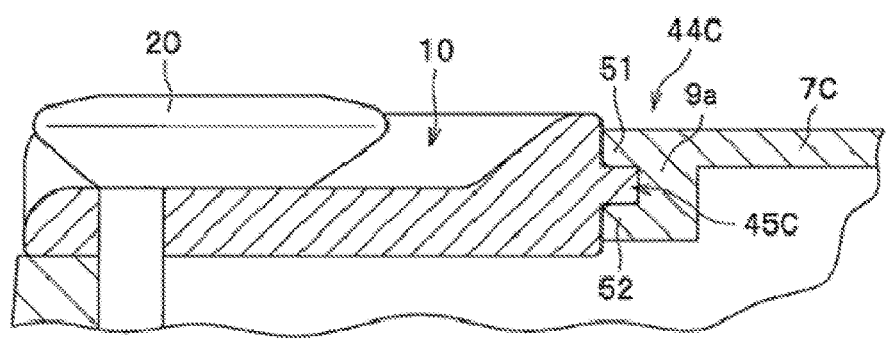
FIG. 8 is a cross-sectional view of a line stopper according to a third modification example.

As the second restricting portion 42 of the present embodiment, the concave portion 44 is formed on the rear side of the supporting member 10, and the convex portion 45 is formed on the skirt portion 7. Alternatively, referring to FIG. 7, a concave portion 44A may be formed on the skirt portion 7B and a convex portion 45B may be formed on the back side of the supporting member 10. In this modification example, the thickness L1 of the rear edge portion 9a of the through hole 9 is the sum of upper and lower third protrusions 51 and a fourth protrusions 52 that serves as the concave portion 44A and the convex portion 45A. Referring to FIG. 8, in the case where the concave portion 44C is formed on the skirt portion 7C, it is preferable that only the rear edge portion 9a of the through hole 9 have a large thickness. In this modification example, it is possible to reduce the weight of the skirt portion 7C.

Figure 9:
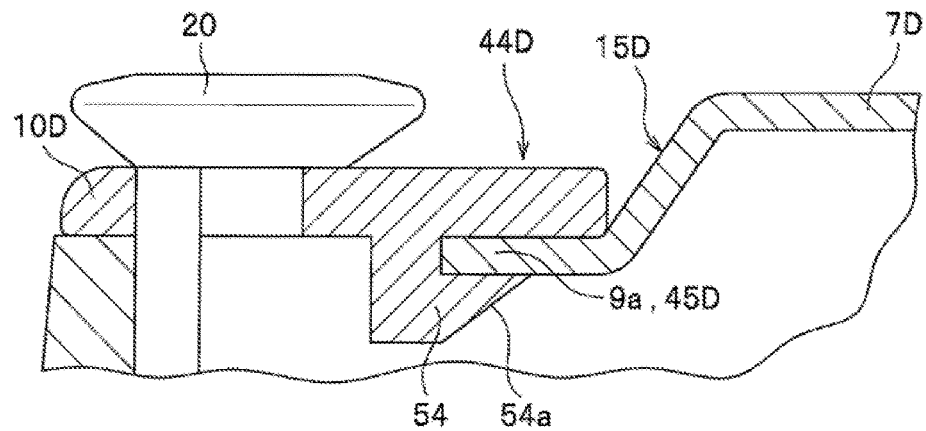
FIG. 9 is a cross-sectional view of a line stopper according to a fourth modification example.
Figure 10:
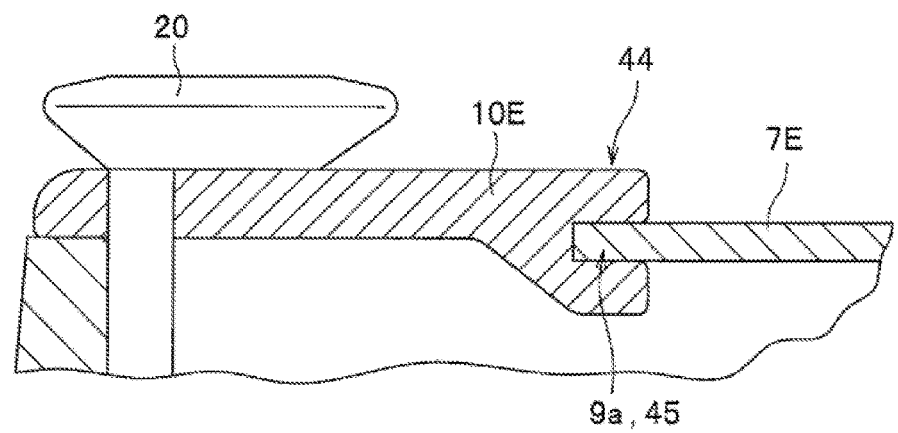
FIG. 10 is a cross-sectional view of a line stopper according to a fifth modification example.

In the above embodiment, the fishing line catching portion 21 of the line stopper member 20 is disposed closer to the inner side in the radial direction by forming the concave surface 15 on the upper surface of the supporting member 10. Alternatively, as shown in FIG. 9, a concave portion 15D recessed radially inward may be formed in a skirt portion 7D, instead of the supporting member 10. Moreover, alternatively, a supporting member 10E and a skirt portion 7E in which the concave surface 15 and the concave portion 15D are not provided may be used.

Referring to FIG. 9, a lower surface 54a of a lower protrusion 54 that serves as a concave portion 44D may be tilted. In this configuration, when a supporting member 10D is disposed above the through hole 9 and then the supporting member 10D is inserted into the through hole 9 while pressing the lower surface 54a of the lower projection 54 against the rear edge portion 9a of the through hole 9, the lower protrusion 54 is deformed and comes below the rear edge portion 9a, which facilitates assembling.

A line stopper according to a second embodiment of the disclosure and a fishing spinning reel to which the line stopper is applied will be now described with reference to the accompanying drawings. Similar to the first embodiment, the "front and rear," "left and right," "upper and lower" directions refer to the directions shown in FIG. 11b in the following description of the second embodiment. In the following embodiments, like elements may be labeled similarly and redundant descriptions will be omitted.

Figure 11A:
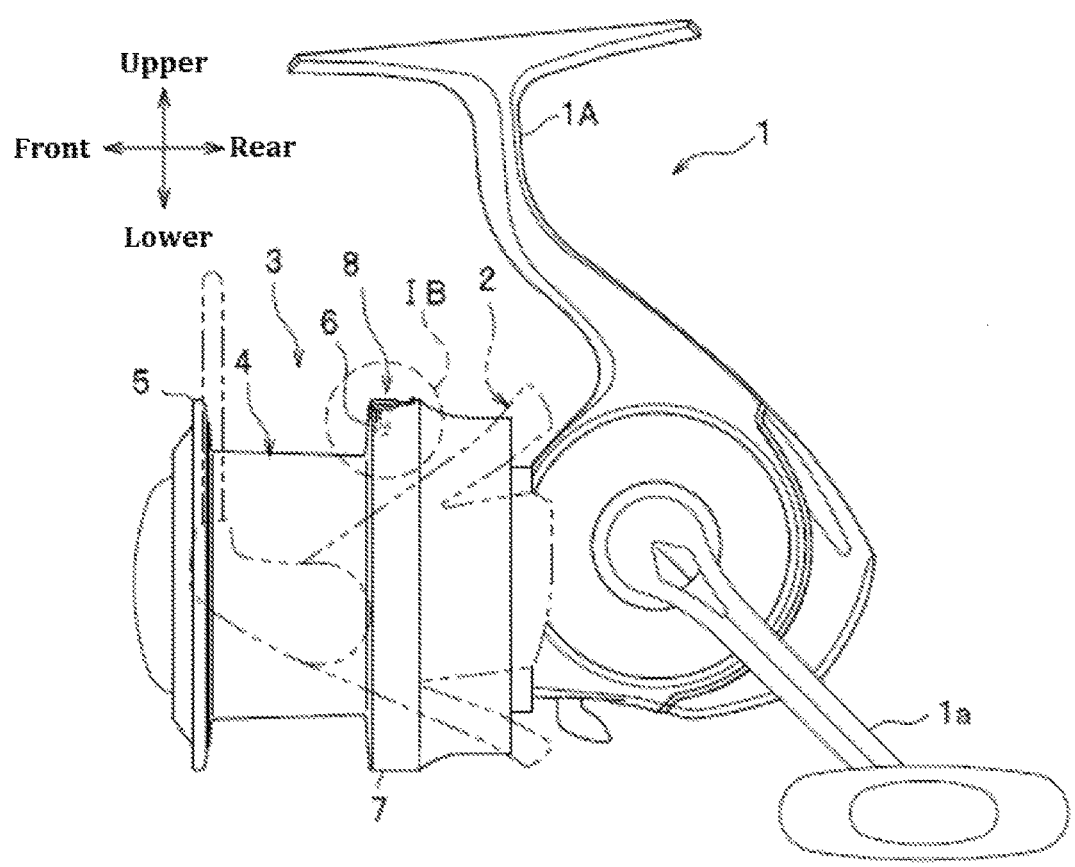
FIG. 11a is an overall side view of a fishing spinning reel to which a line stopper for a fishing spinning reel according to a second embodiment of the disclosure is applied.

In the second embodiment, referring to FIG. 11, the line stopper 10 for locking a fishing line may be provided in the spool 3 of the spinning reel.

The spool 3 may include the cylindrical fishing line winding body 4 around which a fishing line is wound, the front flange 5 rising radially outward from the front end of the fishing line winding body 4, and the rear flange 6 rising radially outward from the rear end of the fishing line winding body 4, and the substantially cylindrical skirt portion 7 extending rearward from the rear flange 6. The skirt portion 7 may be formed to have a larger diameter than the fishing line winding body 4. The spool 3 may be formed by forging for example, an aluminum alloy. The line stopper 8 may be mounted on the outer peripheral portion of the front end of the skirt portion 7.

Figure 11B:
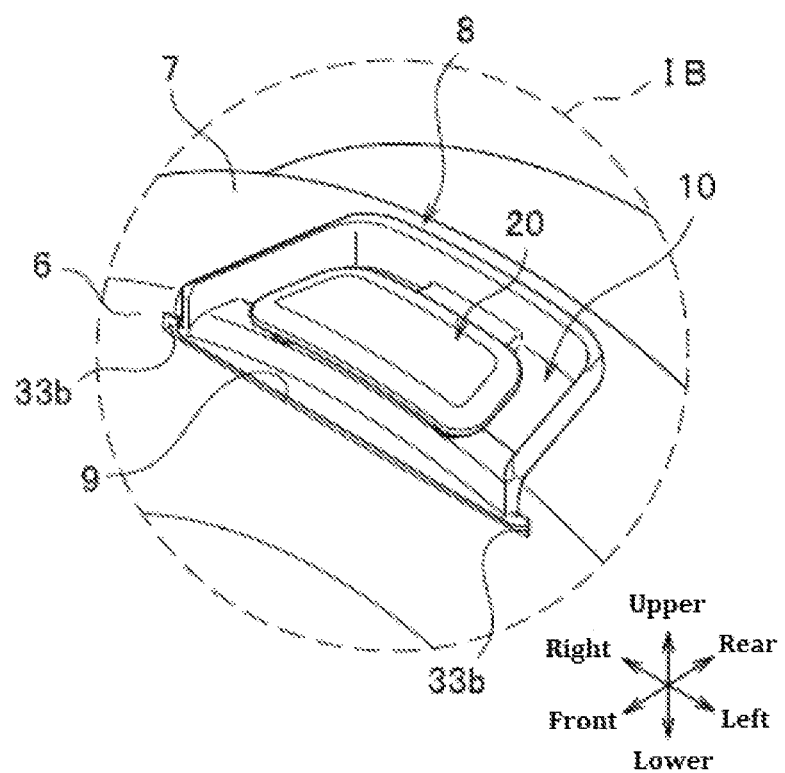
FIG. 11b is a perspective view of the portion surrounded by the dashed line IB as viewed from above the front left.
Figure 12A:
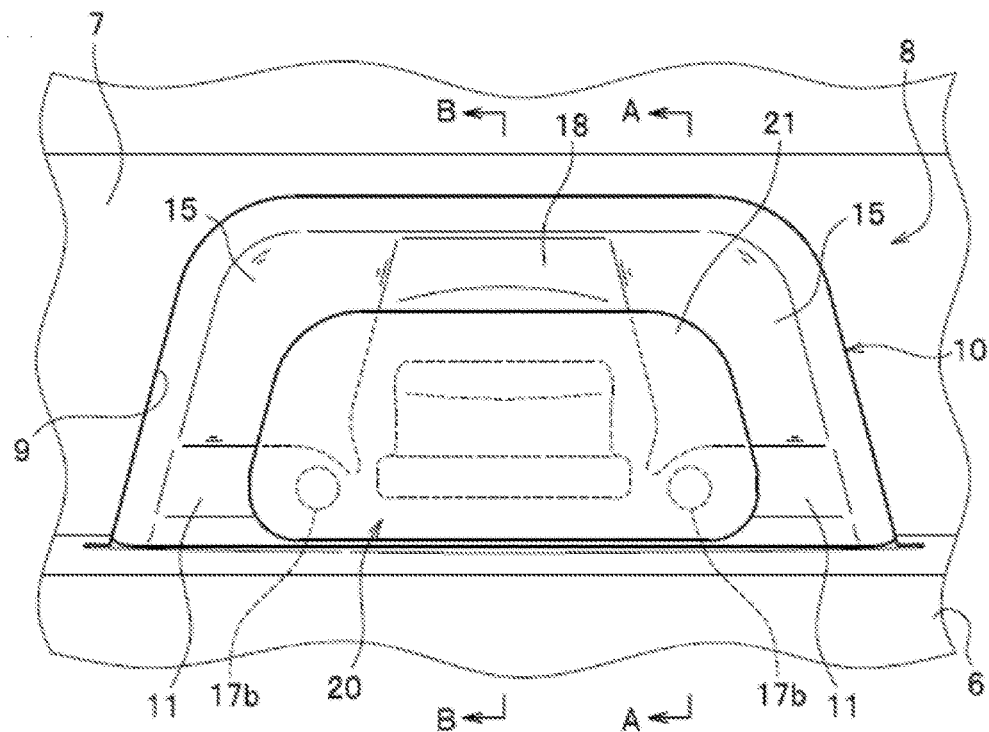
FIG. 12a is a plan view of the line stopper.
Figure 14A:
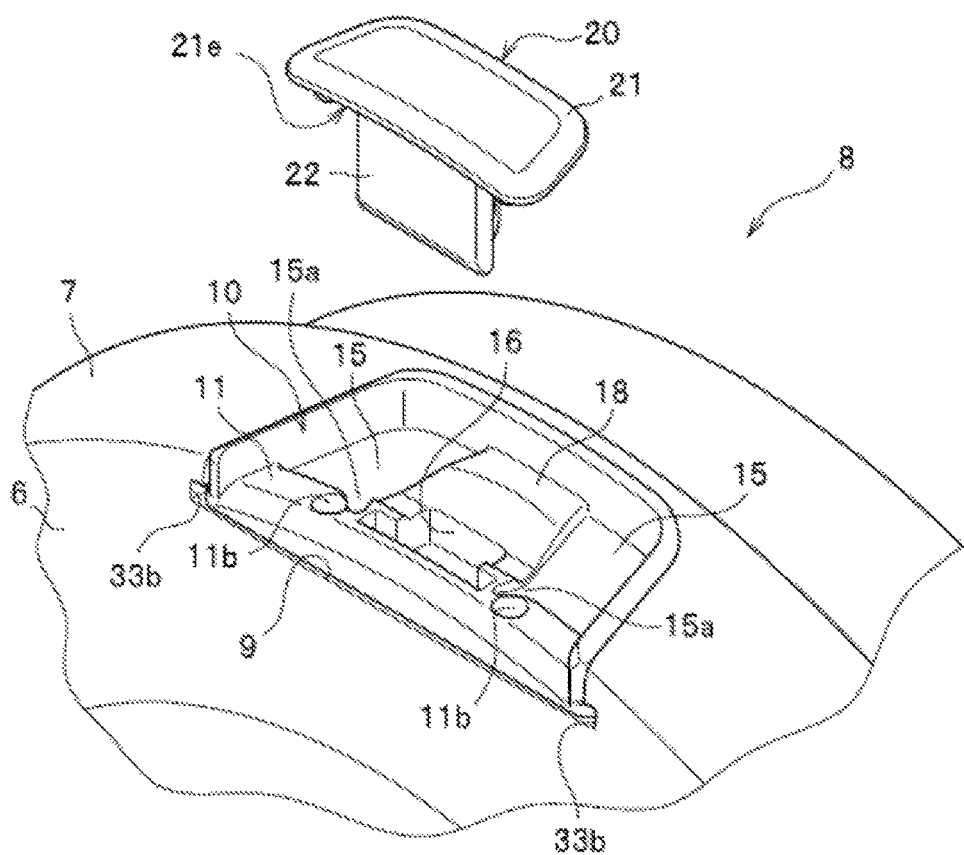
FIG. 14a and FIG. 14b are exploded perspective and front views of the line stopper where the fishing line catching portion is removed.
Figure 14B:
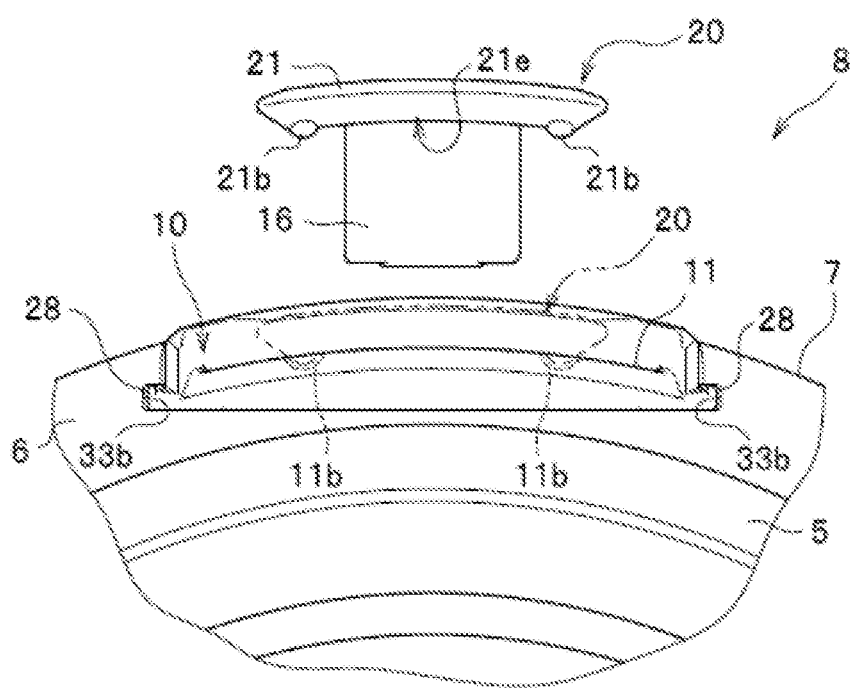

The through hole 9 may be formed in the outer peripheral portion of the front end of the skirt portion 7 for attaching the line stopper 8. Referring to FIG. 12a, the through hole 9 may have a substantially trapezoidal shape in a plan view that corresponds to the outer shape of the supporting member 10 (described later in detail) of the line stopper 8. The through hole 9 may penetrate the outer peripheral portion of the front end of the skirt portion 7 in the radial direction (see FIGS. 16a and 16b). Referring to FIGS. 11b, 14a and 14b, a groove portion 33b may be formed in left and right side walls of the through hole 9. The groove portion 33b may be formed to protrude from the front surface of the rear flange 31b toward the rear (see FIGS. 14a and 14b).

Figure 16A:
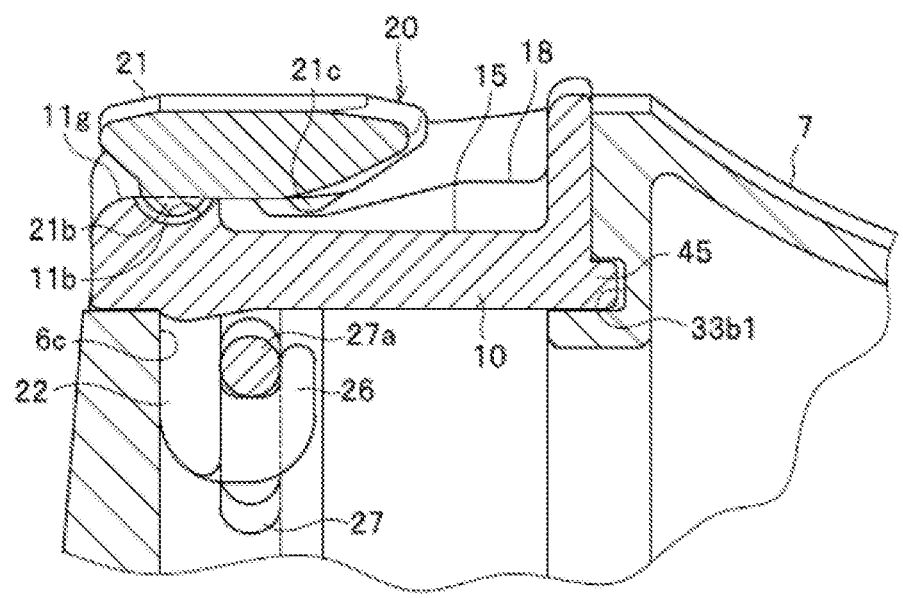
FIG. 16a is an enlarged sectional view along the line A-A in FIG. 12.
Figure 16B:
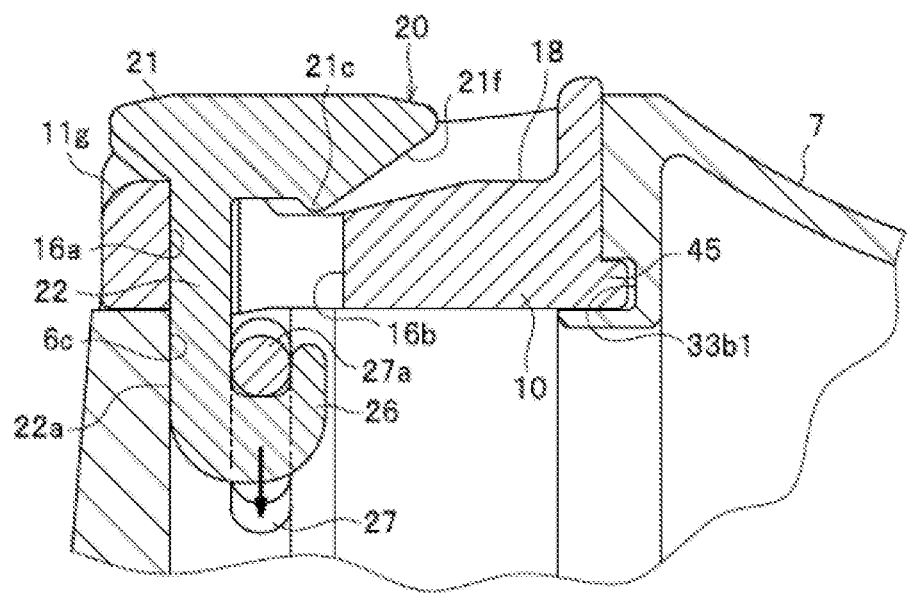
FIG. 16b is an enlarged sectional view along the line B-B in FIG. 12.

Referring to FIG. 12a, the line stopper 8 may include the supporting member 10 and the line stopper member 20. When the line stopper member 20 is attached to the supporting member 10, a fishing line clamping portion R1 (see FIG. 13) in which the fishing line is clamped between the supporting member 10 and the line stopper member 20 is formed. Referring to FIG. 14a, the line stopper member 20 may include the supporting member 16 and a fishing line catching portion 17. The line stopper member 20 will be described later in detail. The supporting member 10 may have a substantially plate-like shape and may be a member attached to the through hole 9 of the skirt portion 7. On the left and right side portions of the supporting member 10, flanges 11a projecting in the lateral direction may be formed. The flanges 11a are engageable with the groove portions 33b of the through hole 9. When mounting the supporting member 10 in the through hole 9, the flanges 11a of the supporting member 10 are inserted into the grooves 33b of the through hole 9 from the front side of the rear flange 31b of the spool 3, and then the supporting member 10 is slidably moved rearward. By this sliding movement, the supporting member 10 can be attached to the through hole 9. Referring to FIGS. 16a and 16b, a rear end portion 11a$l$ of the supporting member 10 may be engaged with a rear wall concave portion 33b1 formed in the rear wall of the through hole 9. When the supporting member 10 is attached, the through hole 9 is closed by the supporting member 10.

Referring again to FIG. 14b, the supporting member 10 may be mounted such that an arc continues on the outer peripheral surface corresponding to the arc of the outer peripheral surface of the skirt portion 7. Such a supporting member 10 serves as a component forming a part of the outer surface of the skirt portion 7.

Figure 13:
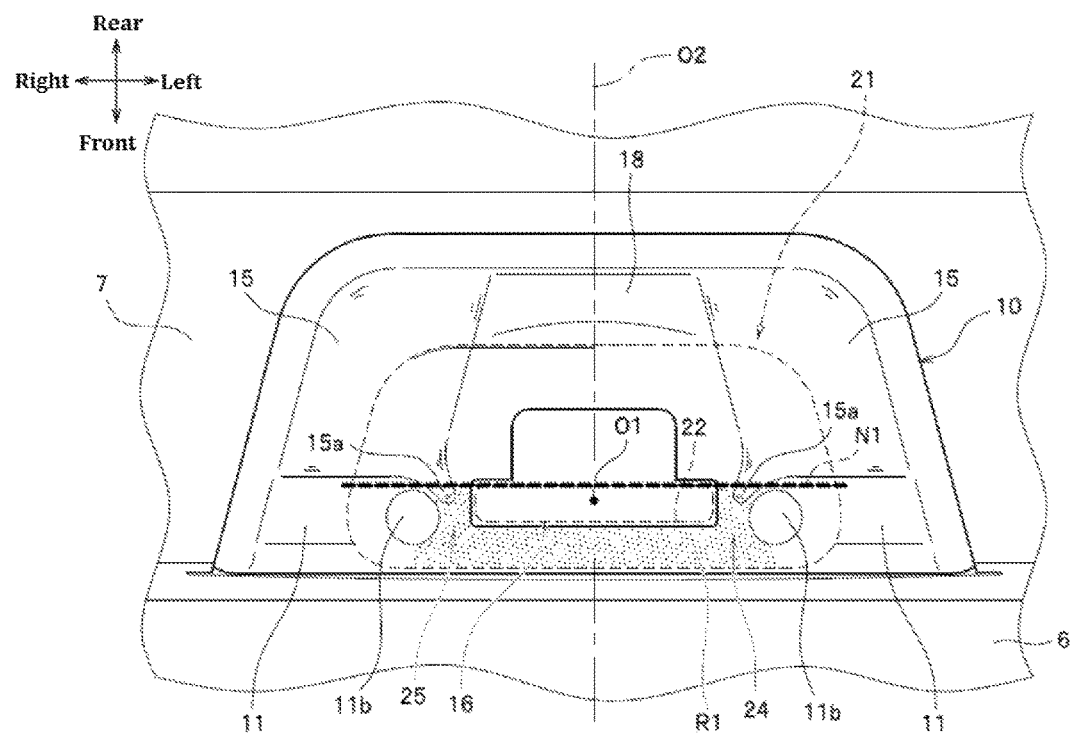
FIG. 13 is a plan view of a fishing line clamping portion situated on the base member side (the fishing line clamping portion is shown in a dotted pattern).

Referring to FIGS. 13 and 14a, the supporting member 10 may include the front portion 11, an extending portion 18 extending rearward from a central portion in the left-right direction of the front portion 11, and the concave surfaces 15, 15 formed on the right and left sides of the extending portion 18. The supporting member 10 is made of, for example, a synthetic resin material.

Figure 12B:
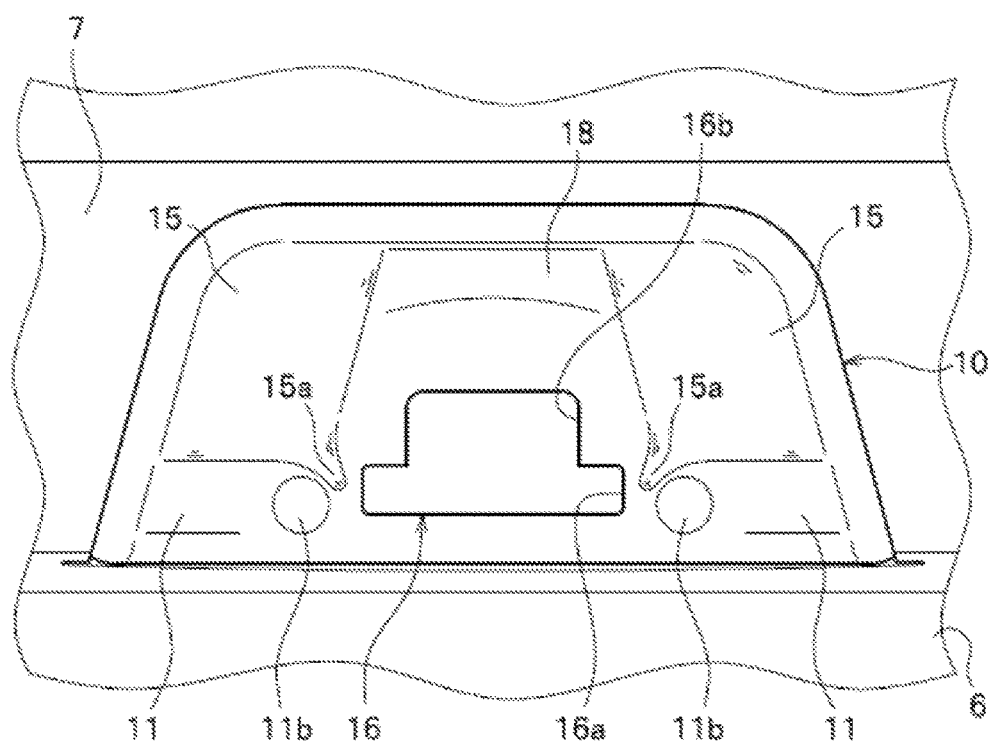
FIG. 12b is a plan view of a base member of the line stopper.

Referring to FIGS. 14a and 14b, the front portion 11 bulges in an arcuate shape corresponding to the arc of the outer peripheral surface of the skirt portion 7 when viewed from the front. Referring to FIGS. 16a and 16b, a front end portion 11g of the front portion 11 may be round chamfered. Therefore it is easy to let a fishing line move to the front portion 11 from the front. Referring to FIGS. 13 and 14a, the central portion in the left-right direction of the front portion 11 may be configured to face a front portion 21e of the fishing line catching portion 21 of the line stopper member 20. The front portion 11 may form a fishing line clamping portion R1 (a region indicated by a dotted pattern in FIG. 13) capable of holding a fishing line between the front portion 11 and the front portion 21e of the line stopper member 20. Furthermore, the front portion 11 may have semispherical engaging recesses 11b, 11b formed at predetermined interval in the left-right direction. An opening 16 may be formed in the central portion in the left-right direction of the front portion 11, as shown in FIG. 12b. The opening 16 may be formed to extend from the front portion 11 to the extending portion 18. The opening 16 may be formed in a brimmed hat shape in a sectional view, and include the front opening portion 16a and the rear opening portion 16b formed continuously with the rear side of the front opening portion 16a. The front opening portion 16a may be situated on the front side and formed to have a larger width in the left-right direction. The rear opening portion 16b may be situated on the rear side of the front opening portion 16a and formed to have a smaller width than the front opening portion 16a. The support shaft portion 16 (see FIG. 15f) of the line stopper member 20 may be inserted through the front opening portion 16*a*. The bent portion 26 (see FIG. 15*f*) of the line stopper member 20 may be inserted through the rear opening portion 16*b*.

The extending portion 18 may be formed continuously from the front portion 11 and bulge radially. The fishing line catching portion 21 may seat (abut) on the front portion side (including the boundary portion with the front portion 11) of the extending portion 18.

The concave surfaces 15, 15 may be formed one step lower than the front portion 11 and the extending portion 18 in the radial direction toward the inside. The concave surface 15 may be surrounded by the front portion 11, the extending portion 18 and the peripheral wall of the supporting member 10. The front end portion 15*a* of each concave surface 15 may extend between the engaging recess 11*b* and the front opening portion 16*a* of the opening 16. In this manner, the right and left concave surfaces 15, 15 (front end portions 15*a*, 15*a*) are continuous to each other and adjacent to the fishing line clamping portion R1 as shown in FIG. 13. Such concave surfaces 15 may serve as spaces for accommodating a leader side portion L1 of the fishing line L clamped by the fishing line clamping portion R1 as described later (see FIG. 17*b*).

Referring to FIGS. 15*a* through 15*f*, the line stopper member 20 may include the support shaft portion 22 and the fishing line catching portion 21 integrally formed on the upper end of the support shaft portion 22. The support shaft portion 22 may have a trapezoidal shape extending in the left-right direction and extending in the radial direction of the skirt portion 7 (see FIGS. 14*a* and 14*b*). At the lower end of the support shaft portion 22, the bent portion 26 bent rearward may be integrally formed. The support shaft portion 22 and the bent portion 26 may be inserted through the opening 16 (the front opening portion 16*a* and the rear opening portion 16*b*) of the supporting member 10, and the lower portions thereof are arranged in the skirt portion 7 as shown in FIG. 16*b*. The width of the support shaft portion 22 corresponds to the width of the front opening portion 16*a* of the opening 16. Whereas the width of the bent portion 26 corresponds to the width of the rear opening portion 16*b* of the opening 16. Inside the skirt portion 7, the central portion 27*a* of the engaging member 27 is locked on the bent portion 26. The engaging member 27 may be a spring member that extends in the circumferential direction of the inner peripheral surface of the skirt portion 7 and is disposed on the inner peripheral surface of the skirt portion 7. The engaging member 27 may be attached such that it is deformed to bias the bent portion 26 downward. The support shaft portion 22 may be biased in the direction indicated by the arrow in FIG. 16*b* by the engaging member 27.

Referring to FIG. 16*b*, the front surface 22*a* of the support shaft portion 22 abuts on the rear surface 6*c* of the rear flange. In this way, displacement (displacement toward the front) of the supporting member 10 in the direction in which the supporting member is detached is restricted, and the supporting member 10 is prevented from coming off from the through hole 9.

Figure 15A:
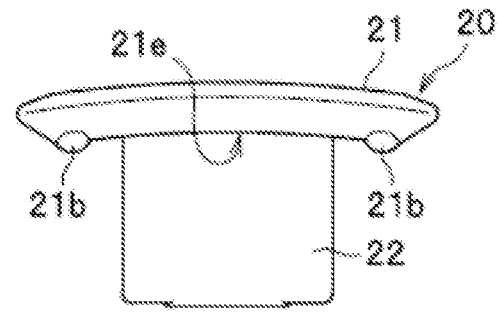
FIG. 15a is a front view of the fishing line catching portion.
Figure 15B:
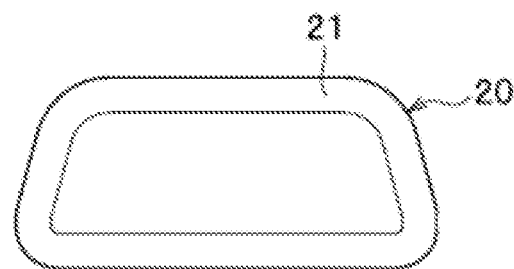
FIG. 15b is a plan view of the fishing line catching portion.
Figure 15C:
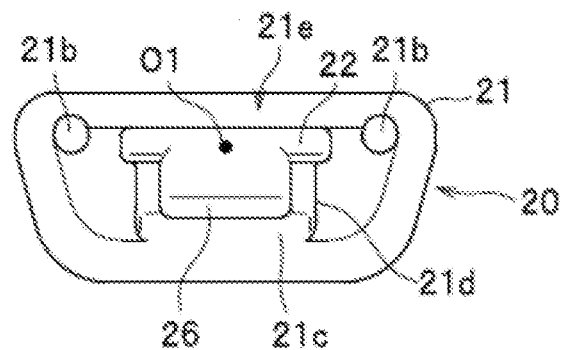
FIG. 15c is a bottom view of the fishing line catching portion.
Figure 15D:
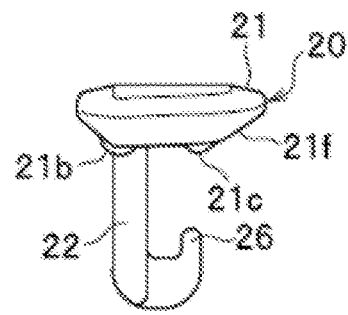
FIG. 15d is a side view of the fishing line catching portion.
Figure 15E:
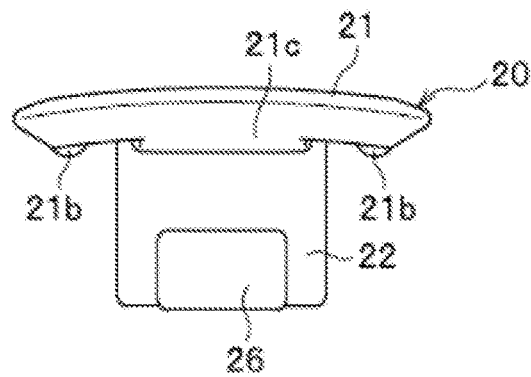
FIG. 15e is a rear view.
Figure 15F:
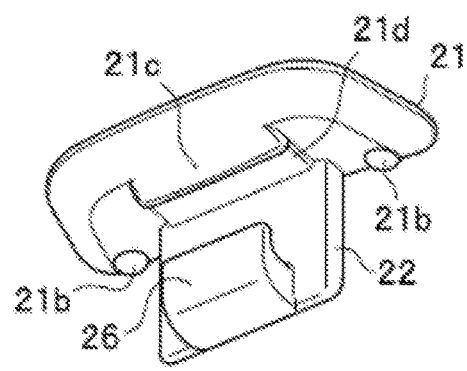
FIG. 15f is a perspective view of the fishing line catching portion obliquely viewed from the bottom of the right rear side.

The fishing line catching portion 21 may have a substantially plate-like shape extending along the outer peripheral surface of the skirt portion 7. The fishing line catching portion 21 is configured to seat (abut) on the supporting member 10 by the bias force of the engaging member 27 described above. Referring to FIG. 15*a*, the front portion (front portion lower surface) 21*e* of the fishing line catching portion 21 may have an arc shape curved upward corresponding to the shape of the front portion 11 of the supporting member 10. Thus, the front portion 21*e* of the fishing line catching portion 21 abuts against the front portion 11 of the supporting member 10 as they are in close contact with each other. In this way, the front portion 21*e* of the fishing line catching portion 21 forms the fishing line clamping portion R1 (see FIG. 13) that holds the fishing line between itself and the front portion 11 of the supporting member 10.

Referring to FIG. 13, the fishing line clamping portion R1 may be formed in a region closer to the front portion which is on the cylindrical fishing line winding body 4 side, in the area (opposing area) where the fishing line catching portion 21 faces the supporting member 10. More specifically, when viewed from the axis O1 direction of the support shaft portion 22, the fishing line clamping portion R1 is provided such that it extends perpendicular to the axis O2 of the spool 3 (skirt portion) and in contact with the rear end portion of the outer surface of the support shaft 22. Moreover when the line N1 extending in the circumferential direction of the skirt portion 7 is set as a reference line, the fishing line clamping portion R1 is provided on the front side with respect to the reference line (line N1). As will be described later, the fishing line is passed through the fishing line clamping portion R1 from the front side and guided to the rear side to intersect and then held thereon.

Protrusions (retaining protrusions) 21*b*, 21*b* may be formed on the front portion 21*e* of the fishing line catching portion 21. The retaining protrusions 21*b*, 21*b* may protrude downward in a hemispherical shape at an interval in the left-right direction (see FIG. 15*a* and the like). Each of the retaining protrusions 21*b* is engageable with the engaging recess 11*b* of the front portion 11 of the supporting member 10 (see FIG. 16*a*). The retaining protrusions 21*b*, 21*b* are engaged with the engaging recesses 11*b*, 11*b* to prevent the fishing line clamped by the fishing line clamping portion R1 from coming off.

The left clamping portion 24 may be formed between the left retaining protrusion 21*b* and the left side portion of the support shaft portion 22 in the fishing line catching portion R1. The right clamping portion 25 may be formed between the right retaining protrusion 21*b* and the right side portion of the support shaft portion 22. In other words, in the fishing line clamping portion R1, the retaining protrusion 21*b* is situated on the front left side of the support shaft portion 22 on the left side of the fishing line clamping portion R1 where the fishing line tends to come off. Moreover, in the right clamping portion 25, the retaining protrusion 21*b* is situated on the front right side of the support shaft 22 on the right side of the right clamping portion 25 where the fishing line tends to come off. That is, the fishing line is clamped in the inner region (rear region) of the retaining protrusions 21*b*, 21*b* and retained by the retaining protrusions 21*b*, 21*b*.

A stepped portion 21*d* projecting downward may be formed on the lower surface of the fishing line catching portion 21 on the rear side of the support shaft portion 22. On the rear end of the stepped portion 21*d*, a ridge 21*c* extending in the right-left direction may be provided.

Next, an operation for locking the fishing line on the line stopper 8 will be described. The leader side portion L1 of the fishing line L wound around the fishing line winding body 4 of the spool 3 is pinched with fingers, and the fishing line L is brought close to the line stopper 8 from the front side as illustrated by the two-dot chain line in FIG. 17*a*. Then, while applying tension to the fishing line L such that the fishing line L is brought into contact with the lower surface of the front left end portion (left front corner portion) of the fishing line catching portion 21, the leader side portion L1 of the fishing line L is moved in the direction indicated by the arrow X (moved toward the extending portion 18 of the member 10 from the left side).

Subsequently, as the fishing line L enters between the fishing line catching portion 21 and the supporting member 10, the fishing line L pushes the fishing line catching portion 21 upward, passes the outer surface of the retaining protrusion 21b (a gap with the engaging recess 11b), and moves to the inner side of the retaining protrusion 21b. Finally, the fishing line L is clamped in the region (the left clamping portion 24) formed between the retaining protrusion 21b and the support shaft portion 22 in the fishing line catching portion R1.

The front end portion 15a of the concave surface 15 may be arranged adjacent to the rear side of the left clamping portion 24. Referring to FIG. 17b, the leader side portion L1 of the fishing line L clamped by the left clamping portion 24 is guided into the concave surface 15 through the front end portion 15a substantially linearly in a plan view (see FIG. 17a).

Figure 17A:
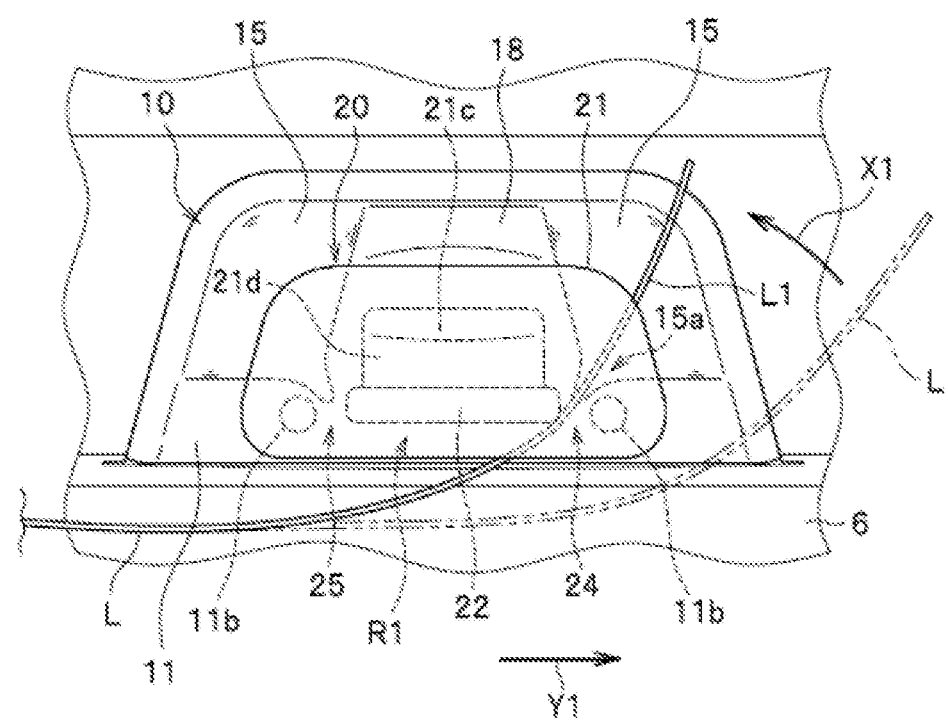
FIG. 17a is a plan view of the line stopper showing how a fishing line is locked.
Figure 17B:
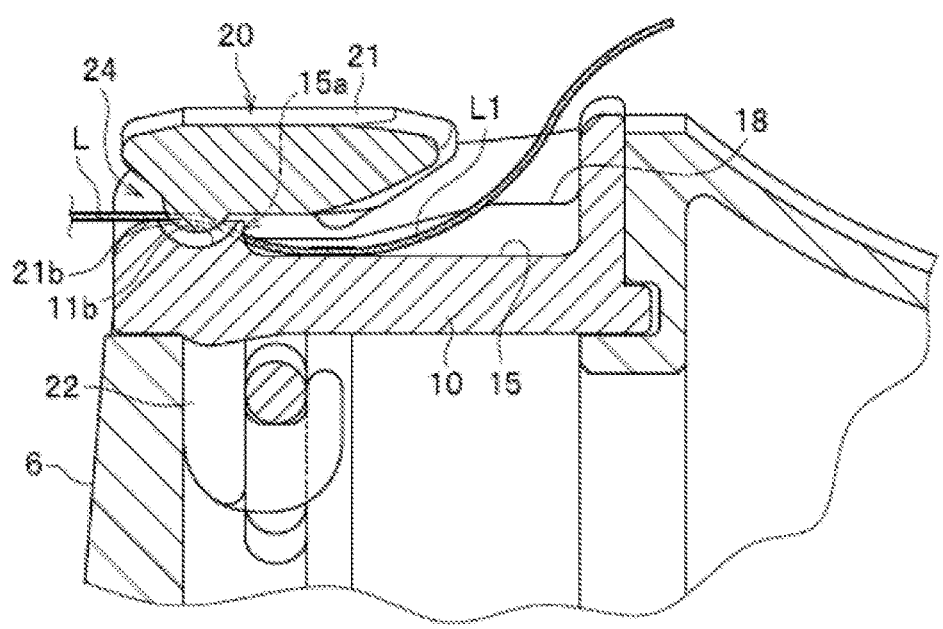
FIG. 17b is a sectional view of the line stopper showing the fishing line held by the fishing line clamping portion.

Here, referring to FIG. 17a, the left clamping portion 24 where the fishing line L is clamped is the lateral (left-side) area of the fishing line catching portion 21 where the leader of the fishing line L wound around the fishing line winding body 4 is to be situated considering the winding direction (the direction pointed by the arrow Y1 in FIG. 17a). Therefore, the fishing line L can be held in a relatively small space in the lateral area of the fishing line catching portion 21 (on the side of the support shaft portion 22).

It should be noted that the fishing line L may be clamped not only by the left clamping portion 24 on the left side of the fishing line catching portion 21 but also by the right clamping portion 25 on the opposite side. In this case, the leader side portion L1 of the fishing line L may be brought close to the right side of the fishing line catching portion 21 and inserted between the fishing line catching portion 21 and the supporting member 10 and then clamped by the right clamping portion 25. Also in this case, the leader side portion L1 of the fishing line L clamped by the right clamping portion 25 can be guided into the right concave surface 15 through the front end portion 15a substantially linearly in a plan view.

In addition, referring to FIG. 16b, the leader side portion L1 of the fishing line L may be routed to the rear side of the fishing line catching portion 21 and then moved into the inner side of the ridge 21c via an inclined surface 21f of the lower rear end to be clamped there.

In the above-described line stopper for a fishing line spinning reel, the fishing line L can be introduced to the fishing line clamping portion R1 (the left clamping portion 24, the right clamping portion 25) from the front side of the fishing line catching portion 21. More specifically, when clamping the fishing line L, unlike the conventional line stopper, it is not necessary to temporarily move the fishing line to the rear side of the fishing line catching portion 21 which is away from the fishing line winding body 4. With the line stopper according to the embodiment, the fishing line L can be directly introduced from the fishing line winding body 4 to the fishing line clamping portion R1 (the left clamping portion 24, the right clamping portion 25) situated in the front area of the fishing line catching portion 21 and clamped there. Moreover, since the fishing line L can be directly introduced from the fishing line winding body 4 to the fishing line clamping portion R1 (the left clamping portion 24, the right clamping portion 25) situated in the front area of the fishing line catching portion 21 and clamped there, it is not necessary to wind the fishing line L around the fishing line catching portion 21 to lock the fishing line as is the case for the conventional line stoppers. Therefore, it is possible to prevent the fishing line L from coming off after the clamping and to prevent the fishing line L from being creased. Furthermore it is possible to clamp the fishing line L easily and quickly with less number of the actions.

Further, the fishing line L can be easily introduced from the front side of the fishing line catching portion 21 to the left clamping portion 24, R12 provided in the lateral area of the fishing line catching portion 21, and therefore it is possible to easily and quickly lock the fishing line L with a small number of actions.

Moreover, the fishing line clamping portion R1 (the left clamping portion 24, the right clamping portion 25) is provided such that it extends perpendicular to the axis O2 of the skirt portion 7 and in contact with the rear end portion of the outer surface of the support shaft 22 when viewed from the axis direction of the support shaft portion 22, and when the line N1 extending in the circumferential direction of the skirt portion 7 is set as the reference line, the fishing line clamping portion R1 is provided on the front side with respect to the reference line N1. Therefore, the fishing line L can be directly introduced to the fishing line clamping portion R1 (the left clamping portion 24, the right clamping portion 25) from the front side of the fishing line catching portion 21, and adequately clamped there.

Further, since the retaining protrusion 21b is provided on the fishing line catching portion 21, disengagement of the fishing line L clamped by the left clamping portion 24 is prevented by the retaining protrusion 21b, and therefore it is possible to prevent the fishing line L from coming off from the left clamping portion 24.

Further, since the engaging recess 11b is provided in the flange 1, it is possible to securely prevent the disengagement of the fishing line L clamped by the fishing line clamping portion R1 (the left clamping portion 24, the right clamping portion 25) by the engagement between the retaining protrusion 21b and the engaging recess 11b. Consequently it is possible to more securely prevent the fishing line L from coming off from the fishing line clamping portion R1 (the left clamping portion 24, the right clamping portion 25).

The left clamping portion 24 and the right clamping portion 25 of the fishing line clamping portion R1 may be formed between the support shaft portion 22 and the retaining protrusions 21b, 21b. With the retaining protrusions 21b, it is possible to effectively prevent the fishing line L clamped by the left clamping portion 24 or the right clamping portion 25 from moving in the outward direction in which the fishing line L is disengaged from the clamping portion. Therefore, the disengagement of the fishing line L clamped by the left clamping portion 24 or the right clamping portion 25 can be adequately prevented while securing the clamping areas of the left clamping portion 24 and the right clamping portion 25.

On the supporting member 10, the concave surfaces 15, 15 for accommodating the leader side portion L1 of the fishing line L clamped by the left clamping portion 24 or the right clamping portion 25 may be provided adjacent to the left clamping portion 24 and the right clamping portion 25. The fishing line L is introduced from the front side of the fishing line catching portion 21 into the left clamping portion 24, the right clamping portion 25 and then slid out from the left clamping portion 24, the right clamping portion 25 onto the concave surfaces 15, 15. Consequently, it is possible to adequately prevent the fishing line L from being creased.

Moreover, in the fishing spinning reel that has the above-described line stopper 8, the fishing line L can be directly introduced from the front side of the fishing line catching portion 21 to the fishing line clamping portion R1 (the left clamping portion 24, the right clamping portion 25), and adequately locked there. As described above, obtained is the fishing spinning reel in which the fishing line L is prevented from coming off after clamped and from being creased, and the fishing line can be easily and quickly locked with less number of the actions.

Figure 18A:
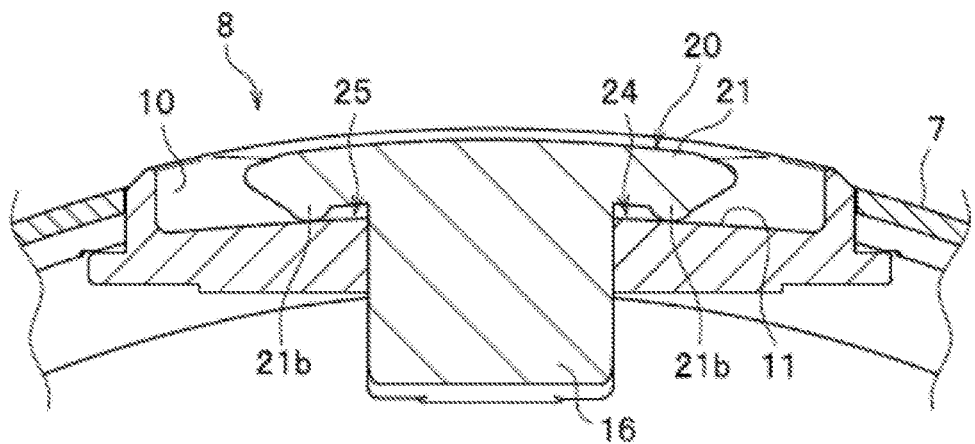
FIGS. 18a-18c are cross-sectional views of a line stopper according to a modification example.
Figure 18B:
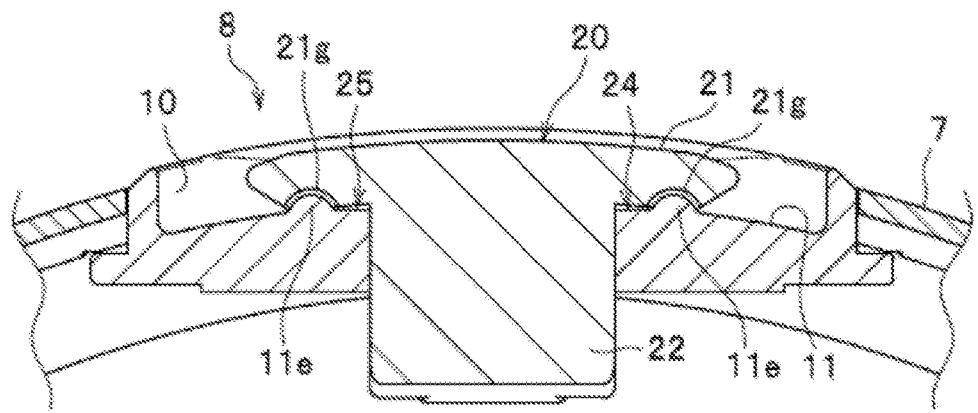
Figure 18C:
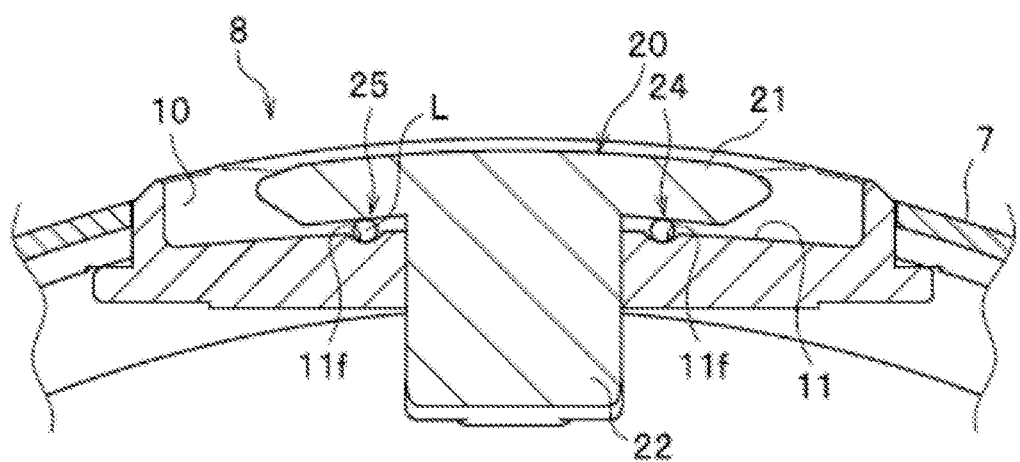

FIGS. 18a through 18c illustrate a modification example of the line stopper. In the line stopper 8 shown in FIG. 18a, a portion (the front portion 11) where the retaining protrusions 21b, 21b of the supporting member 10 abut is planarized. With this configuration, it is also possible to adequately clamp the fishing line (not shown) by the left clamping portion 24, the right clamping portion 25 situated on the inner side of the retaining protrusions 21b, 21b. Further, it is possible to adequately prevent disengagement of the fishing line by the retaining protrusions 21b, 21b.

In the line stopper 8 shown in FIG. 18b, retaining protrusions 11e, 11e are provided in the front portion 11 of the supporting member 10, and engaging recesses 21g, 21g are provided on the fishing line catching portion 21. With this configuration, it is also possible to adequately clamp the fishing line (not shown) at the left clamping portion 24, R12 situated on the inner side of the retaining protrusions 11e, 11e. Further, it is possible to adequately prevent disengagement of the fishing line by the engagement between the retaining protrusions 11e, 11e and the engaging recesses 21g, 21g.

In the line stopper 8 shown in FIG. 18c, the left clamping portion 24 and the right clamping portion 25 of the front portion 11 of the supporting member 10 are provided with receiving grooves 11f, 1 if for accommodating a part of the fishing line L. With this configuration, it is also possible to adequately clamp the fishing line (not shown) by the left clamping portion 24, the right clamping portion 25 situated on the inner side of the retaining protrusions 21b, 21b. In addition, in the left clamping portion 24 and the right clamping portion 25, the fishing line L can be adequately retained in the receiving grooves 11f, 11f, and therefore it is possible to more suitably prevent the disengagement of the fishing line L.

Figure 19:
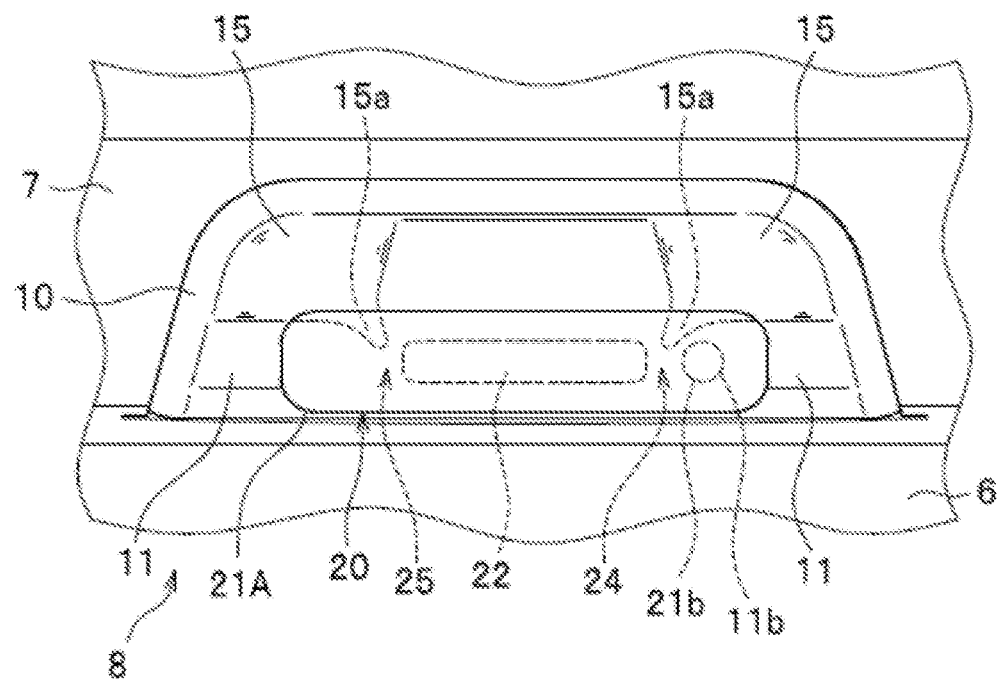
FIG. 19 is a plan view of a line stopper for a fishing spinning reel according to a third embodiment.

FIG. 19 illustrates a line stopper according to a third embodiment and an example of a fishing spinning reel to which the line stopper is applied. The third embodiment is different from the above-described second embodiment in that the fishing line catching portion 21A is formed to be shorter in the front-rear direction so as to save the space for installing the line stopper 8.

The fishing line catching portion 21A is formed long in the right-left direction and short in the front-rear direction in a plan view. The retaining protrusion 21b and the engaging recess 11b may be provided only on the left side (the leader side in the fishing line winding direction) of the fishing line catching portion 21A. In other words, the retaining protrusion 21b and the engaging recess 11b are provided on the side where it is easy to clamp the fishing line from the fishing line winding body 4.

As described above, the embodiment can obtain the line stopper for a fishing spinning reel and the fishing spinning reel thereof in which the fishing line is prevented from coming off after clamped and from being creased, and the fishing line can be easily and quickly locked with less number of the actions. In addition, since the fishing line catching portion 21A is formed to be short in the front-rear direction, it is possible to save the installation space for the line stopper 8, and it is possible to reduce the size and weight of the spool 3.

Figure 20:
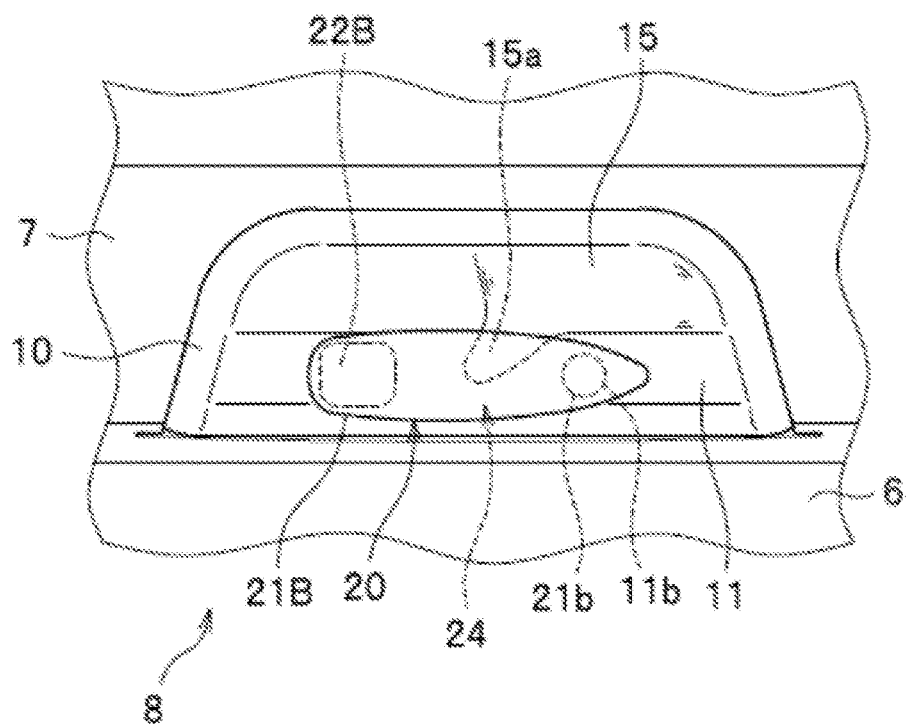
FIG. 20 is a plan view of a line stopper for a fishing spinning reel according to a fourth embodiment.

FIG. 20 illustrates a line stopper according to a fourth embodiment and an example of a fishing spinning reel to which the line stopper is applied. The fourth embodiment is different from the above-described third embodiment in that the fishing line catching portion 21B is supported by a cantilever structure.

The fishing line catching portion 21B may extend in the right-left direction in a plan view, and may be formed in a streamlined shape in which the left end portion, which is the leader side of the fishing line, is tapered. The retaining protrusion 21b and the engaging recess 11b may be provided only on the left side (the leader side in the fishing line winding direction) of the fishing line catching portion 21A. The front end portion 15a of the concave surface 15 may be formed wider than that of the third embodiment and located at the center of the left clamping portion 24.

In this way, the fishing line is easily guided to the concave surface 15.

As described above, the embodiment can obtain the line stopper for a fishing spinning reel and the fishing spinning reel thereof in which the fishing line is prevented from coming off after clamped and from being creased, and the fishing line can be easily and quickly locked with less number of the actions. Moreover, since the fishing line catching portion 21B is supported by the cantilever structure, the left clamping portion 24 can be formed widely to extend in the width direction. Further, since the fishing line catching portion 21B is formed in the streamlined shape in which the left end portion (the leader side) is tapered, it is easy to clamp the fishing line and the clamping operation can be easily performed.

The present invention is not limited to the examples in the above description of the second to forth embodiments. For example, in the second embodiment, the fishing line catching portion 21 is formed in the substantially trapezoidal shape in a plan view, but it is not limited to this. Alternatively it may be formed into various shapes such as a quadrilateral shape, a polygonal shape, an elliptical shape, a circular shape and the like. Although the support shaft portion 22 has a flat plate shape in the above embodiment, it is not limited to this. It may have various shapes such as a polygonal shape, an elliptical shape, a circular shape and the like.

Furthermore, although the supporting member 10 is mounted on the skirt portion 7 in the above embodiment, it is not limited to this. Alternatively the outer surface portion of the skirt portion 7 itself may be used in the same manner as the supporting member 10, and the fishing line catching portions 21, 21A and 21B may be disposed to abut there.

The line stopper member 20 may be configured such that the support shaft portion 22 is fixed on the inner side of the spool 3 with a pin, a screw, or the like, and the fishing line catching portion 21 may hold the fishing line by its elastic deformation.

Figure 21A:
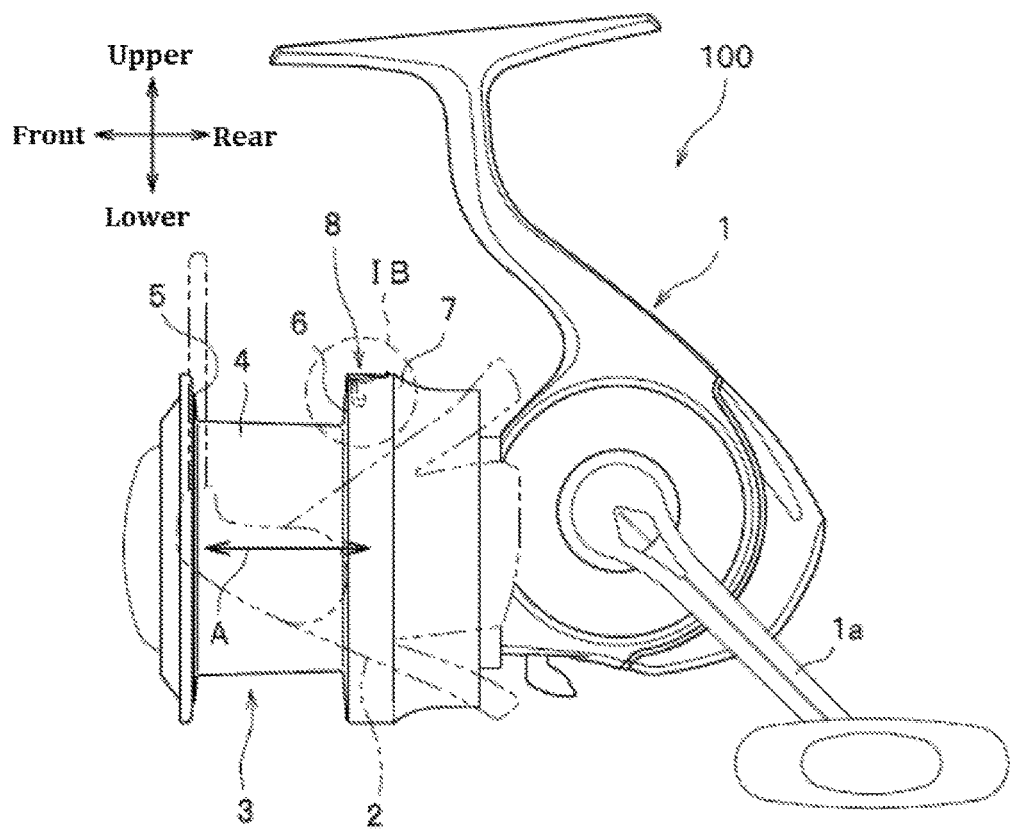
FIG. 21a is a side view of a fishing spinning reel according to a fifth embodiment showing the entire configuration.
Figure 21B:
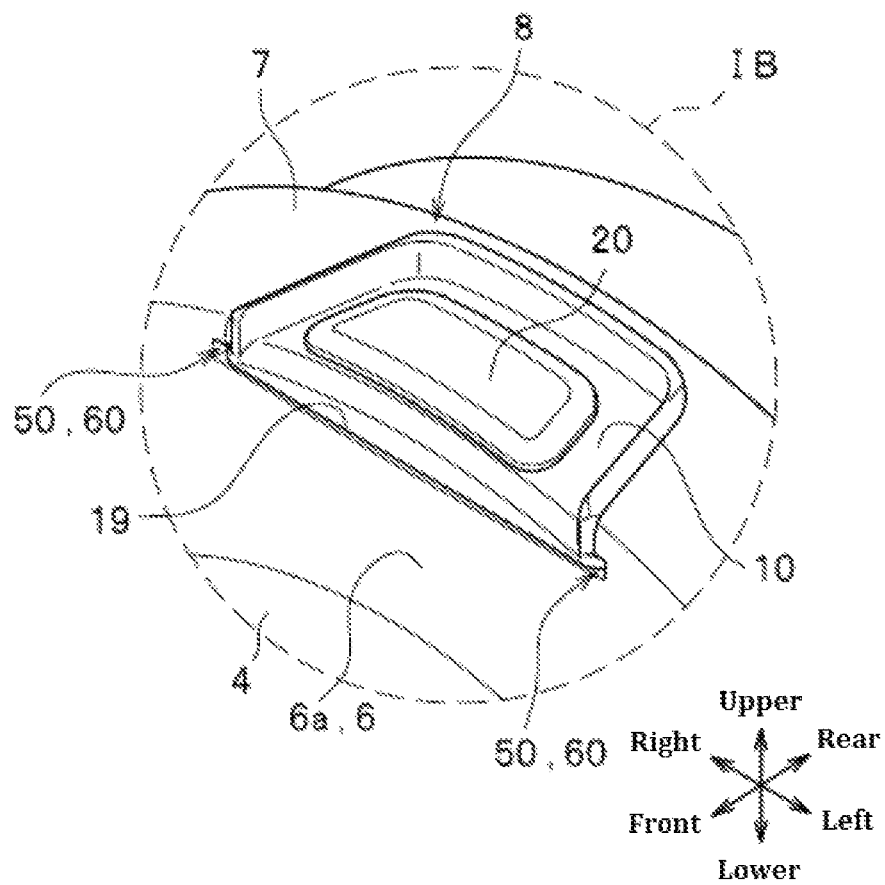
FIG. 21b is a perspective view of the portion surrounded by the broken line IB as viewed from above the left front side.

A line stopper according to a fifth embodiment of the disclosure and a fishing spinning reel to which the line stopper is applied will be now described with reference to the accompanying drawings. As used herein, "front and rear," "upper and lower," and "right and left" directions refer to the directions shown in FIGS. 21a and 21b in the same manner as the first through forth embodiments.

Figure 22:
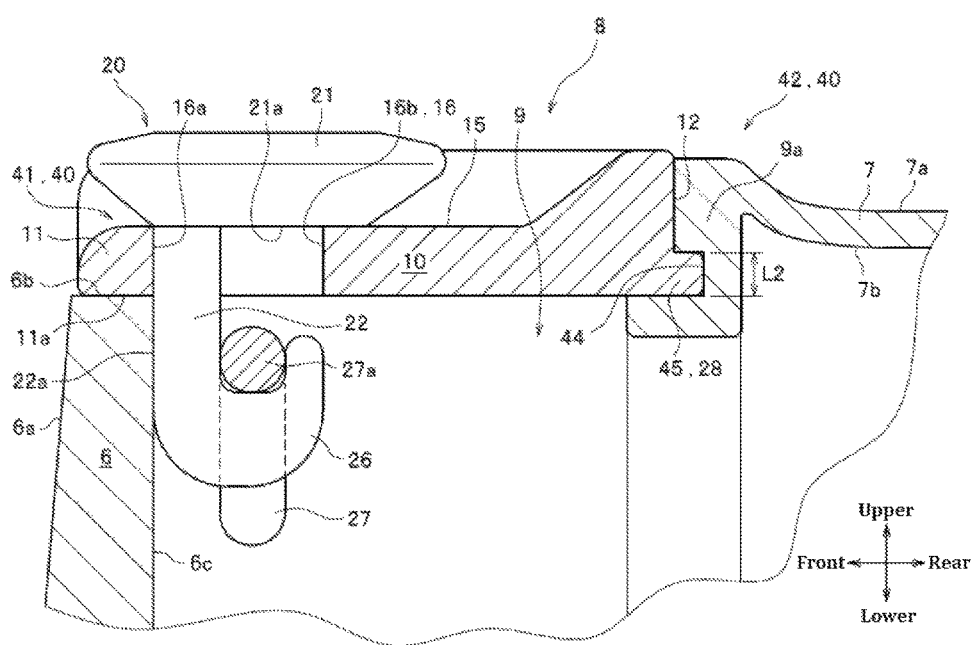
FIG. 22 is a cross-sectional view of a line stopper.
Figure 23:
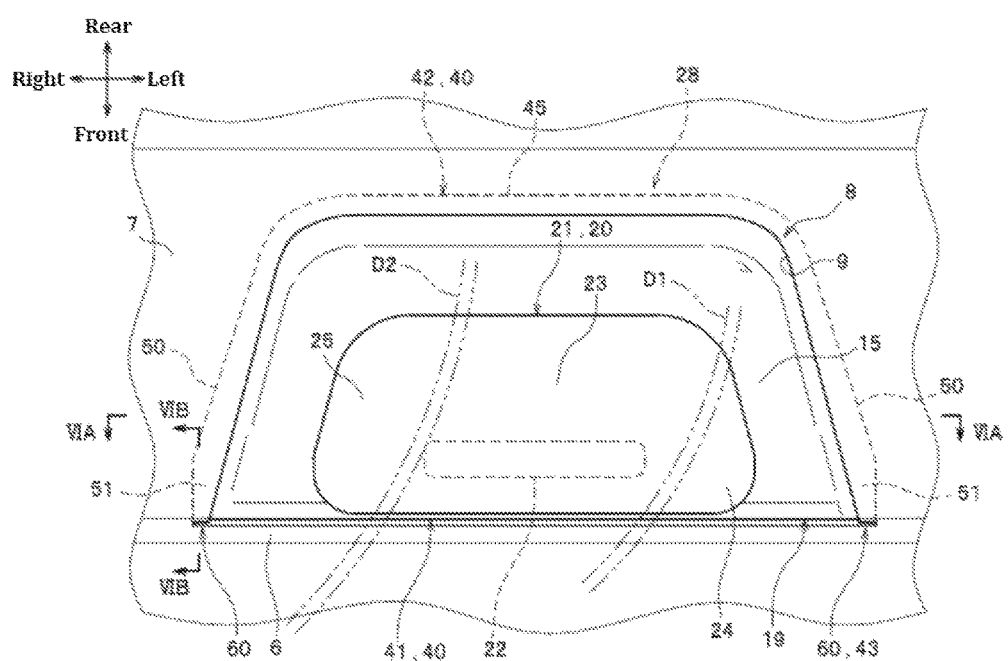
FIG. 23 is a plan view of the line stopper as viewed from above.
Figure 24:
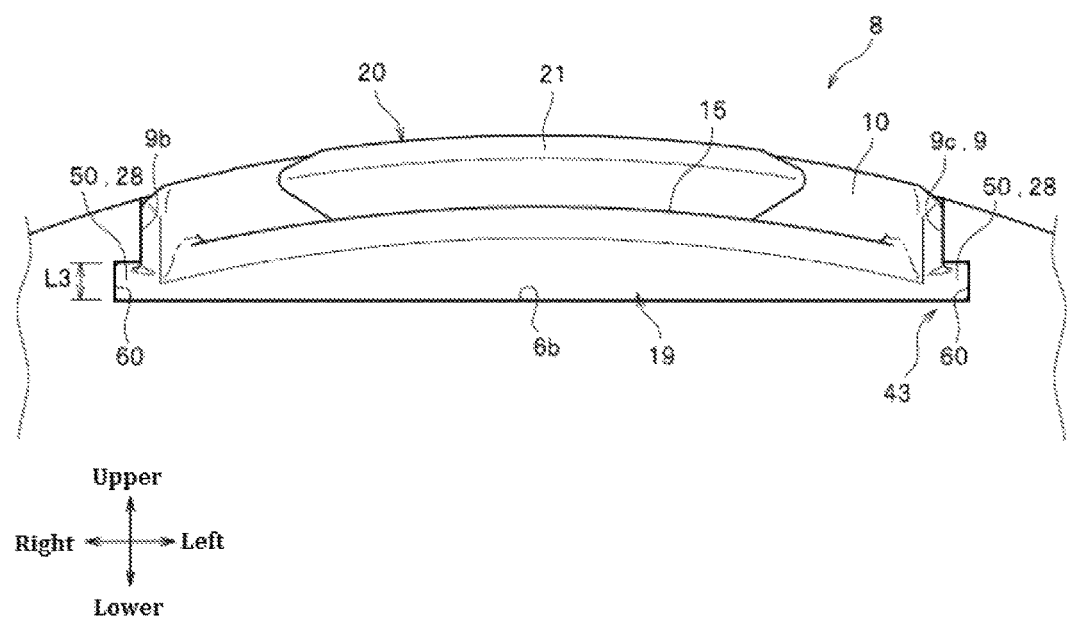
FIG. 24 is a front view of the line stopper as viewed from the front.

Referring to FIGS. 22, 23, and 24, the line stopper 8 may include the through hole 9 penetrating the skirt portion 7, the supporting member 10 that fits in the through hole 9, and the line stopper member 20 on which the support shaft portion 22 penetrating the front portion of the supporting member 10 is formed. The line stopper 8 may further include an engaging member (spring member) 27 for preventing the line stopper member 20 from detaching from the skirt portion 7, the restricting portion 40 that restricts the displacement of the supporting member 10 in the penetrating direction (the upper-lower direction) of the through hole 9, a pair of rails 50, 50 (see FIG. 24) formed on the supporting member 10, and a pair of engaging portions 60, 60 (see FIG. 24) formed on the rear flange 6.

Through-hole

Figure 25A:
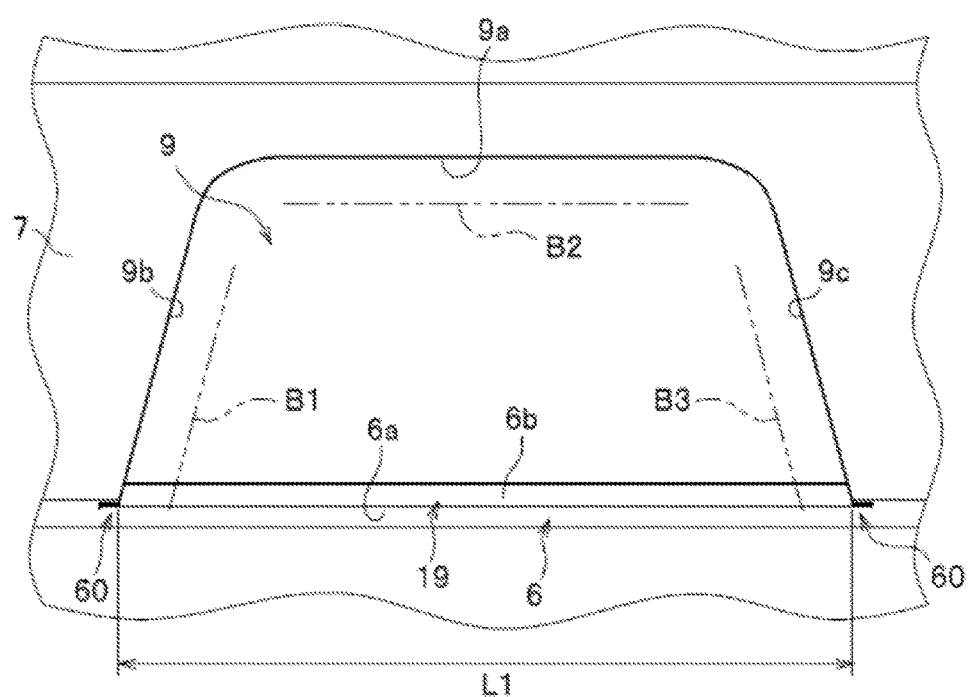
FIG. 25a is a plan view of the line stopper in which a supporting member and the like are detached from a skirt portion as viewed from above.

The through hole 9 may penetrate the upper side of the outer peripheral portion of the skirt portion 7 in the radial direction. Accordingly, the extending direction (penetration direction) of the through hole 9 is along the upper-lower direction. Referring to FIG. 25a, the width of the through hole 9 in the left-right direction (circumferential direction) may gradually narrow toward the rear. Thus, the opening of the through hole 9 has a substantially trapezoidal shape.

Here, the through hole 9 of the embodiment may be formed by cutting the front portion of the cylindrical skirt portion 7 into a substantially C-shape (see broken lines B1, B2, and B3) at the time of manufacture and removing substantially C-shape portion. The peripheral edge portion (the cut end of the skirt portion 7) of the through hole 9 may have a rear edge portion 9a extending in the right-left direction (circumferential direction) to form the rear edge of the through hole 9, a right edge portion 9b extending forward from the right end of the rear edge portion 9a to form the right edge of the through hole 9, and a left edge portion 9c extending forward from the left end of the rear edge portion 9a to form the left edge of the through hole 9.

To form the through hole 9, cutting is performed from the front surface 6a of the rear flange 6 toward the skirt portion 7 situated therebehind so that a part of the rear flange 6 is cut out. Thus, an insertion hole 19 through which the supporting member 10 can be installed inside the through hole 9 is formed in the front surface 6a of the rear flange 6. The supporting member 10 is slid to move from the front side of the rear flange 6 to the rear side to be installed in the through hole 9. Further, a recessed surface (hereunder referred to as the "abutting surface 6b") dented inward in the radial direction compared to other portions may be formed in the outer periphery of the rear flange 6 (see FIG. 22). The width in the right-left direction of the insertion hole 19 is set to L1 which is the largest in the lateral width of the through hole 9 (see FIG. 25a).

Supporting Member

Figure 25B:
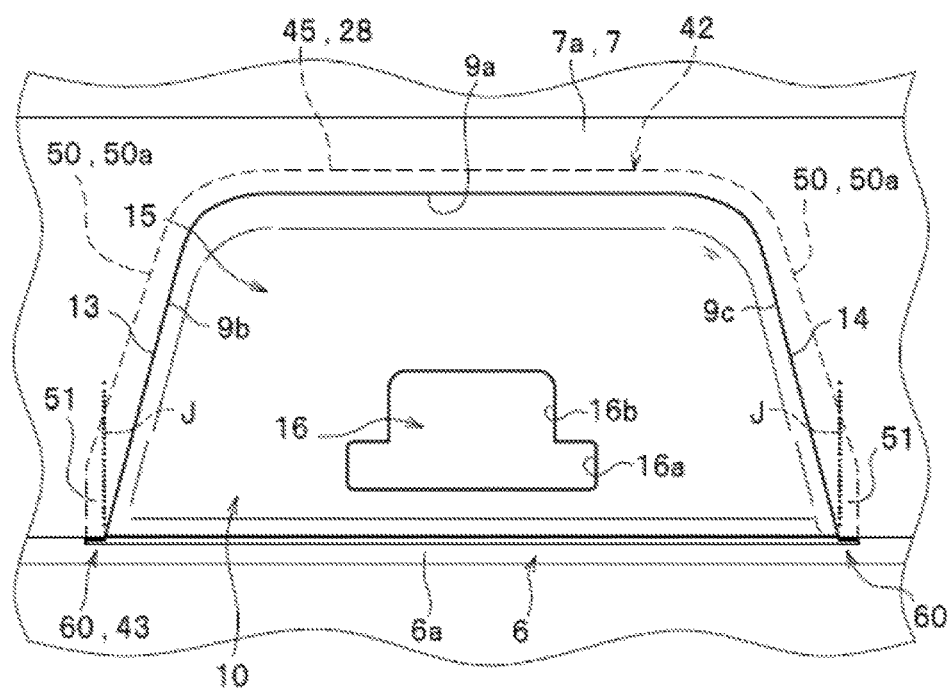
FIG. 25b is a plan view of the line stopper in which only the supporting member is attached to the skirt portion as viewed from above.

The supporting member 10 may be a resin member that supports the line stopper member 20, fits in the through hole 9, and has a trapezoidal shape in a plan view. Referring to FIG. 25b, the outer shape of the supporting member 10 may correspond to the through hole 9 and may be formed in a substantially trapezoidal shape. Accordingly the rear end surface 12 of the supporting member 10 contacts the rear edge portion 9a of the through hole (see FIG. 22). The right end surface 13 of the supporting member 10 contacts the right edge portion 9b of the through hole (see FIG. 26a). The left end surface 14 of the supporting member 10 contacts the left edge portion 9c of the through hole (see FIG. 26a). As described above, the space between the supporting member 10 and the periphery of the through hole 9 is sealed.

The width of the supporting member 10 in the right-left direction before being mounted in the through hole 9 may be slightly larger than the width of the through hole 9 in the right-left direction. Therefore the supporting member 10 may be mounted such that the right end surface 13 and the left end surface 14 of the supporting member 10 are press-fitted with the right edge portion 9b and the left edge portion 9c of the through hole 9 (see the arrow C in FIG. 26a). In the above-described way, a gap is less likely to be generated between the right end surface 13, the left end surface 14 of the supporting member 10 and the periphery (the right edge portion 9b, the left edge portion 9c) of the through hole 9, resulting in a higher sealing performance.

Referring to FIG. 22, a lower surface 11a of a front portion 11 of the supporting member 10 may contact the abutting surface 6b of the rear flange 6.
In this way, the space between the supporting member 10 and the rear flange 6 is sealed.

Referring again to FIG. 22, the central portion of the upper surface of the supporting member 10 may have a concave surface 15 recessed downward. Therefore, a fishing line catching portion 21 (described later) of the line stopper member 20 is positioned radially inward compared to a case where the concave surface 15 is not provided. The concave surface 15 may be formed to extend to the front end of the supporting member 10. In this way, the fishing line that is wound around the fishing line winding body 4 can be easily laid on the concave surface 15.

Referring to FIG. 25b, the opening 16 having a substantially T shape in a plan view may be formed in the concave surface 15. The opening 16 is a hole for inserting the support shaft portion 22 and the like therein when the line stopper member 20 is attached to the skirt portion 7. The opening 16 may include the front opening portion 16a that is situated on the front side and has a longer width in the right-left direction, and a rear opening portion 16b that is situated on the rear side and has a smaller width in the right-left direction. The support shaft portion 22 (see FIG. 22) of the line stopper member 20 may be inserted through the front opening portion 16a, and a bent portion 26 (described later, see FIG. 22) of the line stopper member 20 may be passed through the rear opening portion 16b.

Referring to FIG. 25b, a flange 28 that protrudes outward may be formed on the peripheral end face of the supporting member 10. The flange 28 may be formed continuously over the rear end face 12, the right end face 13, and the left end face 14 of the supporting member 10 and have a substantially C shape as viewed from the radial direction. The thickness in the upper-lower direction (radial direction) of the flange 28 is set to L2 (see FIG. 2).

Line Stopper Member

Referring again to FIG. 22, the line stopper member 20 may include a fishing line catching portion 21 disposed on the supporting member 10 (radially outer side), the support shaft portion 22 extending downward (radially inner side) from the fishing line catching portion 21, and a substantially U-shaped bent portion 26 bent upward from the lower end of the support shaft portion 22.

The fishing line catching portion 21 is for clamping the fishing line between the catching portion and the concave surface 15 of the supporting member 10, and a lower surface 21a of the fishing line catching portion 21 may contact the concave surface 15. Referring to FIG. 23, the fishing line catching portion 21 may have a rectangular shape in a plan view. The fishing line catching portion 21 may include a base portion 23 to which the support shaft portion 22 is connected, a left clamping portion 24 extending leftward from the base portion 23, and a right clamping portion 25 extending rightward from the base portion 23. The fishing line catching portion 21 may be formed relatively long in the right-left direction. A fishing line may be clamped between the left clamping portion 24 and the concave surface 15 (see D1 in FIG. 23), or between the right clamping portion 25 and the concave surface 15 (see D2 in FIG. 23).

The clamping portion (the left clamping portion 24 and the right clamping portion 25) according to the embodiment extends in the right-left direction with respect to the base portion 23, whereas a conventional clamping portion extends toward the rear side with respect to the base portion. Therefore, according to the embodiment, the length of the fishing line catching portion 21 in the front-rear direction is shorter than that of the conventional fishing line catching portion. Consequently, the length of the line stopper 8 including the supporting member 10 in the front-rear direction is shorter than that of the conventional line stopper, and the length of the skirt portion 7 in the front-rear direction is also shorter than the conventional skirt portion.

Referring to FIG. 22, the support shaft portion 22 may penetrate the front opening portion 16a situated on the front end side of the supporting member 10, and extend into the skirt portion 7. The front surface 22a of the support shaft portion 22 may abut on a rear surface 6c of the rear flange 6. In this way, the line stopper member 20 is inhibited from moving toward the front.

Figure 26A:
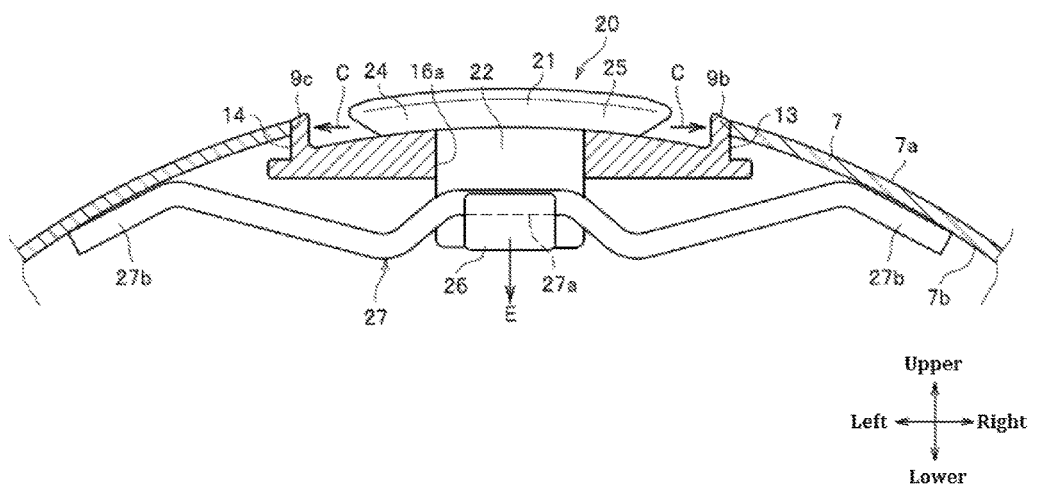
FIG. 26a is a fragmentary sectional view along the line VIA-VIA of FIG. 23

Referring to FIG. 26a, the support shaft portion 22 may be formed long in the right-left direction and have a plate-like shape. The length of the support shaft portion 22 in the left-right direction may be same as that of the front opening portion 16a. In this way, the support shaft portion 22 that passes through the front opening portion 16a of the supporting member 10 is inhibited from moving toward the rear opening portion 16b (see FIG. 25b), in other words, the supporting member 10 is prevented from moving toward the front.

Spring Member

Referring to FIG. 26a, the spring member 27 may be a wire that is elastically deformable and extends in the right-left direction. The engaging member 27 may be attached such that it biases the bent portion 26 of the support shaft portion 22 downward (radially inward). More specifically, both end portions 27b, 27b of the spring member 27 are brought into contact with an inner peripheral surface 7b of the skirt portion 7, and a central portion 27a of the spring member 27 is caught by the bent portion 26 to bias the line stopper member 20 downward (see the arrow E) all the time. In this way, a fishing line inserted between the left clamping portion 24 (or the right clamping portion 25) of the fishing line catching portion 21 and the concave surface 15 of the supporting member 10 is strongly clamped by the elastic force of the spring member 27.

Restricting Portion

Referring to FIG. 23, the restricting portion 40 may include the first restricting portion (guide restricting portion) 41 that prevents the front side of the supporting member 10 from moving in the upper-lower direction that is the penetrating direction, and the second restricting portion (guide restricting portion) 41 that prevents the rear side of the supporting member 10 from moving in the upper-lower direction.

First Restricting Portion

Referring to FIG. 22, the first restricting portion 41 may include an abutting surface 6b of the rear flange 6 and the fishing line catching portion 21 of the fishing line stopper member 20. The abutting surface 6b contacts the lower surface 11a of the front portion 11 of the supporting member 10, and prevents the supporting member 10 from moving downward (radially inward). The fishing line catching portion 21 contacts the upper surface (concave surface 15) of the supporting member 10 on the front side, and prevents the supporting member 10 from moving upward (radially outside). As described above, displacement of the front portion 11 of the supporting member 10 in the upper-lower direction (radial direction) may be restricted by the first restricting portion 41.

Further, since the fishing line catching portion 21 is constantly biased downward (radially inward) by the spring member 27, the fishing line catching portion 21 abuts on the front portion 11 of the supporting member 10 downward. In this way, the front portion 11 of the supporting member 10 is strongly clamped in the upper-lower direction by the abutting surface 6b and the fishing line stopper member 20. Therefore, the fixation strength with which the supporting member 10 is fixed to the spool 3 is very high. Moreover, since the fishing line catching portion 21 abuts on the supporting member 10 downward, a gap is hardly formed between the supporting member 10 and the abutting surface 6b, resulting in a high sealing property.

Second Restricting Portion

The second restricting portion 42 may include a concave portion 44 formed in the skirt portion 7 and a convex portion 45 formed on the rear end portion of the supporting member 10. In this embodiment, the concave portion 44 may be formed by hollowing a part of the rear edge portion 9a of the through hole 9 rearward. The convex portion 45 may be a portion of the flange 28 of the supporting member 10 that protrudes rearward from the rear end surface 12. The convex portion 45 is fitted into the concave portion 44 thereby the supporting member 10 and the skirt portion 7 are engaged with each other in the upper-lower direction. As described above, displacement of the rear portion of the supporting member 10 in the upper-lower direction (radial direction) is restricted by the second restricting portion 42. Referring to FIGS. 22 and 23, the concave portion 44 may extend in the right-left direction (circumferential direction) in the rear end surface 12. Therefore foreign substances are hardly pass between the rear end surface 12 of the supporting member 10 and the rear edge portion 9a of the through hole 9, resulting in a high sealing property.

Engaging Portion

Referring to FIG. 24, the pair of engaging portions 60, 60 may be recesses formed by partially notching the left and right edge portions (rear flange 6) of the insertion hole 19. The height (length in the radial direction) L3 of the internal space of the engaging portion 60 is the same as the thickness L2 (see FIG. 22) of the flange 28. Further, referring to FIG. 26b, the engaging portion 60 may be formed to extend from the front face 6a to the rear face 6c of the rear flange 6. In this case, with the internal space of the engaging portion 60, the front space of the rear flange 6 and the internal space of the skirt portion 7 are communicated.

Rail Portion

When the supporting member 10 is inserted into the insertion port 19 from the front of the insertion port 19, the pair of rail portions 50, 50 are inserted into the pair of engaging portions 60, 60, and the supporting member 10 is guided into the through hole 9.

Referring to FIG. 25b, the pair of rail portions 50, 50 may be provided on the flange 28 of the supporting member 10 and include a portion that protrudes to the right from the right end surface 13 and a portion that protrudes to the left from the left end surface 14. Outer edges 50a, 50a of the pair of rail portions 50, 50 are inclined such that the distance therebetween increases from the rear toward the front. In other words, the pair of rail portions 50, 50 spread out in a tapered shape from the rear toward the front. Therefore, a portion (hereinafter referred to as a "front rail 51") situated outside the left and right edge portions of the insertion hole 19 in each rail portion 50 is formed only on the front side of each rail portion 50 (See the left and right regions outside of the auxiliary line J).

Figure 26B:
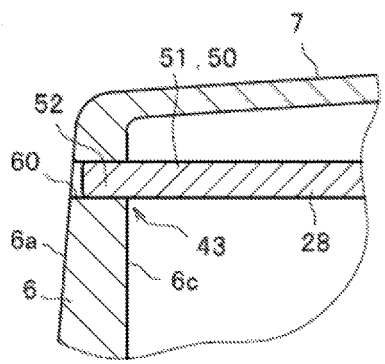
FIG. 26b is a fragmentary sectional view taken along the line VIB-VIB of FIG. 23.

Referring to FIG. 26b, the front end 52 of each rail portion 50 is disposed in the engaging portion 60. As described above, since the thickness of the rail portion 50 (the thickness L2 of the flange 28) and the internal height (the length in the radial direction) L3 of the engaging portion 60 are the same, the rail portion 50 and the engaging portion 60 are engaged with each other. In this manner, the front portion 11 of the supporting member 10 is prevented from moving in the upper-lower direction (radial direction), and thereby the fixing strength for fixing the supporting member 10 to the spool 3 is increased. Here, the restricting portion that includes the rail portion 50 and the engaging portion 60 is referred to as a third restricting portion (guide restricting portion) 43.

Figure 27A:
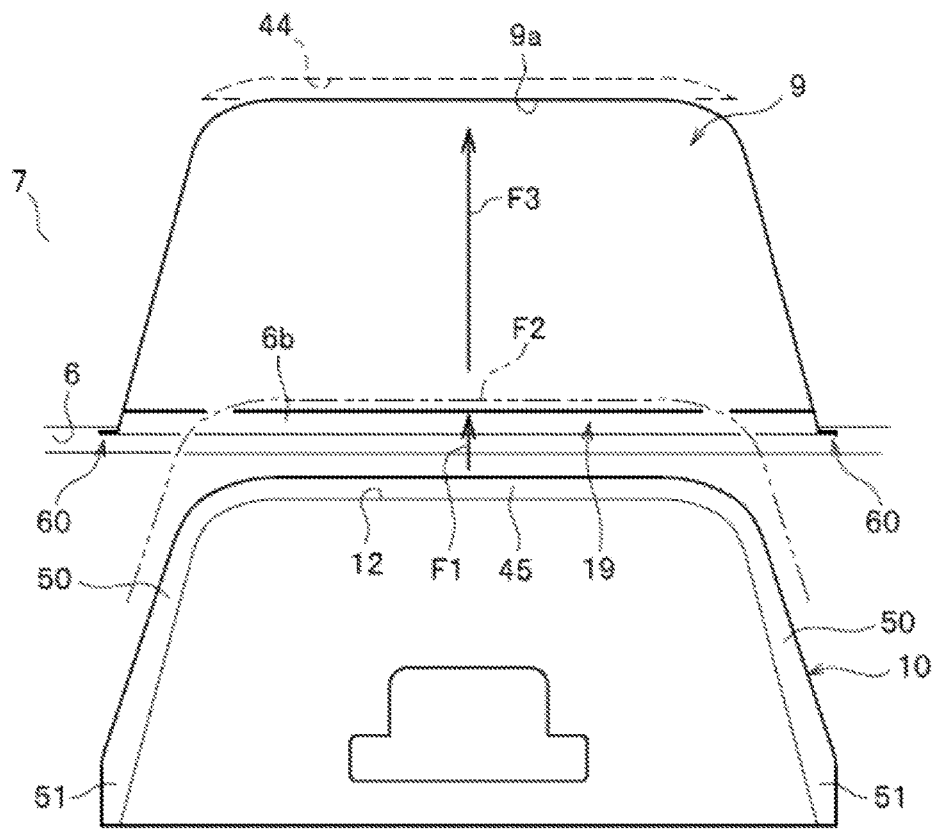
FIG. 27a is a plan view of a first step in an attachment process of the supporting member viewed from above, FIG.
Figure 27B:
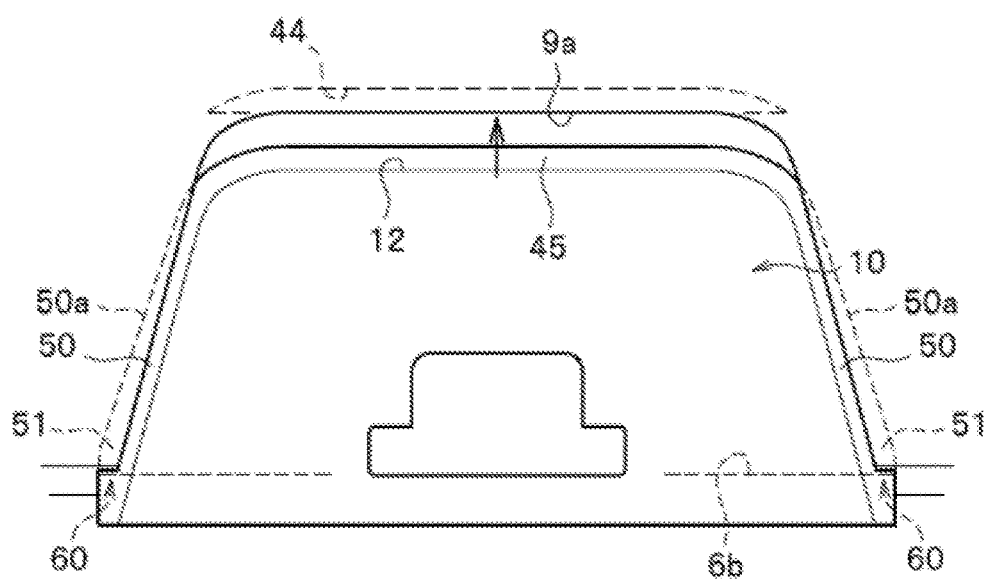

Next, an attaching process of the supporting member 10 will be described with reference to FIG. 27. In a first step, referring to FIG. 27, the supporting member 10 is disposed in front of the insertion hole 19 of the rear flange 6, and the rear end (convex portion 45) of the supporting member 10 is directed toward the rear (insertion hole 19). In a second step, the supporting member 10 is slid rearward (see the arrow F1), and the rear end (convex portion 45) of the supporting member 10 is inserted into the insertion hole 19 (see the two-dot chain line F2). In a third step, the lower surface of the convex portion 45 of the supporting member 10 is abutted with the abutting surface 6b of the rear flange 6. In a fourth step, the supporting member 10 is further slid rearward (see arrow F3), and the rear end surface 12 of the supporting member 10 is brought into contact with the rear edge portion 9a of the through hole 9. In this manner, the convex portion 45 of the supporting member 10 is inserted into the concave portion 44 of the rear edge portion 9a of the through hole 9 and thereby the supporting member 10 is attached in the through hole 9.

According to the third step, the supporting member 10 slides rearward while the lower surface is in contact (slides) with the abutting surface 6b and therefore it is possible to prevent the supporting member 10 from moving downward (inward in the radial direction) during the sliding movement of the fourth step. Consequently, the front rails 51, 51 of the supporting member 10 are inserted into the engagement portion 60 when the supporting member 10 is further slid rearward in the fourth step.

Once the front rails 51, 51 are inserted into the engaging portion 60, it is possible to suppress displacement of the supporting member 10 in the upper-lower direction (radial direction) when the supporting member 10 is slid rearward. Consequently, the convex portion 45 of the supporting member 10 is securely inserted into the concave portion 44 when the supporting member 10 is further slid rearward.

As described above, according to the feature of the embodiment, since the supporting member 10 fits in the through hole 9 and the sealing property between the supporting member 10 and the peripheral portion of the through hole 9 is high, it is prevented that foreign substances from entering inside the skirt portion 7 (main body).

Moreover, according to the embodiment, the first restricting portion 41 is composed of the abutting surface 6b and the line stopper member 20. The second restricting portion 42 and the third restricting portion 43 are composed of the concave portions 44, the engaging portion 60, the convex portion 45, and the rail portion 50. Therefore, the supporting member 10 can be fixed to the spool 3 with a simple mechanism.

Moreover, according to the embodiment, in the attaching operation of the supporting member 10, the attitude of the supporting member 10 that slides and moves backward is maintained in the right position so that the convex portion 45 is securely inserted into the concave portion 44. Therefore, the supporting member 10 can be easily attached and the attaching operation can be efficiently performed.

In this manner, at least the first restricting portion 41 and the second restricting portion 42, or the third restricting portion (the pair of rail portions 50, 50 and the pair of engaging portions 60, 60) formed at the opposed portions of the peripheral portion of the through hole 9 and the supporting member 10 serve as the guide restricting portion which allows sliding movement of the supporting member 10 and restricts displacement of the supporting member 10 in the radial direction.

A line stopper according to a sixth embodiment of the disclosure and a fishing spinning reel to which the line stopper is applied will be now described. Referring to FIG. 28, a line stopper 8A may include the supporting member 10 that fits in the through hole 9, the line stopper member 20, and a restricting portion 40A that restricts displacement of the supporting member 10 in the penetration direction (upper-lower direction) of the through hole 9, and a pair of rail portions 50A, 50A formed in the skirt portion 7, and a pair of engaging portions 60A. 60A formed in the supporting member 10. The line stopper 8A of the sixth embodiment is different from the line stopper of the fifth embodiment in that it includes the restricting portion 40A, the pair of rail portions 50A, 50A, and the pair of engaging portions 60A, 60A. The differences will be hereunder mainly described.

Referring to FIG. 28, the restricting portion 40A may include a third restricting portion (guide restricting portion) 43A in addition to the first restricting portion 41 and the second restricting portion 42 described in the first embodiment.

Third Restricting Portion

Referring to FIG. 29, the third restricting portions 43A may include concave portions 46 formed in the right end surface 13 and the left end surface 14 of the supporting member 10 respectively, and a convex portion 47 formed in the skirt portion 7. The concave portion 46 may be formed by providing protrusions 46a, 46a that protrudes outward in the circumferential direction at the upper end and the lower end of the right end surface 13 of the support member 10. The convex portion 47 may be the right edge portion 9b or the left edge portion 9c of the through hole 9 and inserted into the concave portion 46. Thus the supporting member 10 and the skirt portion 7 are engaged with each other in the upper-lower direction. As described above, displacement of the right and left sides of the supporting member 10 in the upper-lower direction (radial direction) is restricted by the third restricting portion 43A. With the third restricting portion 43A, the fixation strength with which the supporting member 10 is fixed to the spool 3 is increased.

The pair of engaging portions 60A, 60A may be the above-described left and right concave portions 46, 46 of the supporting member 10. The concave portions 46, 46 are situated on the inner side of the left and right edges of the insertion opening 19 in the right-left direction (see the auxiliary line K in FIG. 28). Therefore, the concave portions 46, 46 are configured such that they do not get caught by the edge of the insertion hole 19, when the support member 10 is disposed in front of the insertion hole 19 and is subsequently slid rearward to be fitted in the through hole 9.

The pair of rail portions 50A, 50A may be formed as the right edge portion 9b and the left edge portion 9c of the through hole. The through hole 9 is the same as the first embodiment. Referring to FIG. 30, the right edge portion 9b and the left edge portion 9c of the through hole 9 overhang a part of the insertion hole 19 when viewed from the rear flange 6 side.

The attachment process of the support member 10 according to the sixth embodiment includes the same steps (the first step, the second step, the third step, and the fourth step) as those of the fifth embodiment. Referring to FIG. 31, once the pair of rail portions 50A, 50A are inserted into the pair of engaging portions 60A, 60A in the fourth step, displacement of the supporting member 10 in the upper-lower direction (radial direction) is prevented. As the supporting member 10 is subsequently slid rearward, the convex portion 45 of the supporting member 10 is securely inserted into the concave portion 44. Therefore, also in the second embodiment, the supporting member 10 can be easily attached and the attaching operation can be efficiently performed.

The line stopper 8, 8A according to the fifth and sixth embodiments has been described. However, the invention is not limited to the examples in the above embodiments. For example, the pair of rail portions 50, 50 and the pair of engaging portions 60, 60 of the fifth embodiment, and the pair of rail portions 50A, 50A and the pair of engaging portions 60A, 60A of the sixth embodiment may be combined.

Although the pair of engaging portions 60A, 60A (concave portions 46, 46) of the sixth embodiment is formed only in a part of the right end surface 13 and the left edge surface 14 of the support member 10, alternatively it may be formed over the entire right and left edge surfaces 13, 14 in the front-rear direction.

The shape of the through hole 9 is a substantially trapezoidal shape in the above-described embodiments. However the shape of the through hole 9 is not limited. For example, it may be a rectangle or it may be a substantially triangular through hole 109 as shown in FIG. 12a. When the substantially triangular through hole 109 is used as shown in FIG. 32a, the angle θ1 between the front surface 6a of the rear flange 6 and a notch (see the auxiliary line M1) for forming left and right end edges 109a, 109a of the through hole 109 becomes an obtuse angle. Consequently, burrs are less likely to be generated on the front surface 6a and the rear surface 6c of the rear flange portion 6 and the insertion hole 19 can be made larger, so that the supporting member 10 can be easily inserted into the insertion hole 19.

Alternatively, as shown in FIG. 32b, a through hole 209 may have a profile where a trapezoidal hole 210 arranged on the front side and a rectangular hole 211 arranged on the rear side are combined. In this configuration, the angle θ2 between the front surface 6a of the rear flange 6 and a notch (see the auxiliary line M2) for forming left and right end edges 210a, 210a of the through hole 210 becomes an obtuse angle. Consequently, even in such a modification example, burrs are less likely to be generated on the front surface 6a and the rear surface 6c of the rear flange portion 6 and the insertion hole 19 can be made larger, so that the supporting member 10 can be easily inserted into the insertion hole 19.

Further, the supporting member 10 is formed of a synthetic resin material, and an elastically deformable portion may be further formed in the supporting member 10. The elastically deformable portion is disposed between the end surfaces (the rear end surface 12, the right end surface 13, and the left end surface 14) of the support member 10 and the peripheral edge portion of the through hole 9. Moreover, a raised portion may be formed on the peripheral edge portion of the through hole 9. In addition, when the support member 10 is slid to the position where it fits in the through hole 9, the elastically deformable portion may be elastically deformed by the raised portion and engaged with each other.

In the above embodiment, the rail portions 50, 50A and the engaging portions 60, 60A are formed on both sides in the left-right direction (circumferential direction). Alternatively, the rail portion and the engaging portion may be provided on only one side in the right-left direction.

In the above embodiments, the examples in which the line stopper is applied to the spinning reel have been described, however it should be understood that it is also applicable to double-bearing reels. In this case, the through hole is formed not on the spool but on the reel body, and the supporting member 10 is slidably inserted into the through hole formed in the reel body.

Even in the case of a double-bearing reel, the structures described in the above embodiments can be adopted in a method of fitting the line stopper in the through hole.

The invention also includes the following features. A line stopper for a fishing reel may include a line stopper member that has a fishing line catching portion and a support shaft portion, and a supporting member that supports the line stopper member and fits in a through hole formed in an outer peripheral surface of the spool of the fishing reel. The supporting member includes a first restricting portion and a second restricting portion that are formed at each end in the spool shaft direction to restrict the supporting member from falling into the through hole.

The first restricting portion abuts on a flange of the spool.

The second restricting portion engages with the peripheral edge portion of the through hole with concave and convex portions.

The line stopper may further include an engaging member that prevents the line stopper member from being detached from the spool. The engaging member constantly biases the support shaft portion toward the inside of the spool.

The engaging member may be a spring.

The support member further includes a third restriction portion that is provided on a side surface except the side surfaces of the one end and the other end and that prevents the supporting member from falling into the through hole.

A line stopper for a fishing spinning reel may include a line stopper member that is provided at a skirt portion of a spool, and a supporting member that fits in a through hole provided in a part of the skirt portion and supports the line stopper member. An insertion hole is formed in a front surface of a rear flange of the spool by notching the front surface toward the rear. The support member can be inserted from the front of the rear flange into the through hole via the insertion hole. A guide restricting portion is formed in a portion where the peripheral edge portion of the through hole faces the support member. With the guide restricting portion, the supporting member can slide to the through hole and displacement of the supporting member in the radial direction is restricted.

The guide restricting portion may include a rail portion that extends in the spool shaft direction on the side portion in the radial direction and an engaging portion that has a substantially C-shape as viewed from the spool shaft direction. The rail portion may be formed on one of the supporting member or the spool and the engaging portion may be formed on the other of the supporting member or the spool.

A pair of the rail portions that protrude from the insertion hole outward in the circumferential direction as viewed from the spool shaft direction is formed on the side portion of the supporting member in the circumferential direction. A pair of the engaging portions is formed by notching the side portion of the insertion hole circumferentially outward and situated on the side portion of the insertion hole in circumferential direction.

The circumferentially side portion of the peripheral edge portion of the through hole protrudes into the insertion hole as viewed from the spool shaft direction to form a pair of the rail portions. On the circumferentially side portion of the support member, a pair of the engaging portions situated in the insertion hole is provided as viewed from the spool shaft direction.

The supporting member may have a width larger than the circumferential width of the through hole, and press-fitted into the through hole.

A line stopper for a fishing spinning reel that is arranged in a skirt portion of a spool, may include: a support shaft portion that extends in the radial direction of the skirt portion, and a fishing line catching portion that is provided on the end portion of the support shaft portion. The fishing line catching portion has a fishing line clamping portion, and the fishing line is clamped between the fishing line clamping portion and the outer surface portion of the skirt portion. In the region where the fishing line catching portion faces the outer surface portion of the skirt portion, the fishing line clamping portion is provided on the front side area, which is the side closer to the fishing line winding body, or on the side portion area of the fishing line catching portion where the leader of the fishing line wound around the fishing line winding body is to be situated considering the winding direction.

Moreover, the fishing line clamping portion may be provided such that it extends perpendicular to the central axis of the skirt portion and in contact with the rear end portion of the outer surface of the support shaft as viewed from the axial direction of the support shaft portion, and when the line extending in the circumferential direction of the skirt portion is set as the reference line, the fishing line clamping portion is situated on the front side with respect to the reference line.

One of the outer surface portion of the skirt portion or the fishing line catching portion is provided with a protrusion that protrudes toward the other of the outer surface portion of the skirt portion or the fishing line catching portion.

On the other of the outer surface portion of the skirt portion or the fishing line catching portion where the retaining protrusion is not provided, an engaging recess with which the protrusion is engaged is provided.

At least a part of the fishing line clamping portion is formed between the support shaft and the protrusion.

On the outer surface portion of the skirt portion side, a concave surface for accommodating a leader side portion of a fishing line clamped by the clamping portion may be provided adjacent to the clamping portion.

What is claimed is:

1. A line stopper installed in a fishing reel, comprising:
a fishing line catching portion; and
a supporting member disposed under the fishing line catching portion to lock a fishing line between the fishing line catching portion and the supporting member,
wherein the fishing line catching portion has a support shaft portion for connecting the fishing line catching portion with the supporting member,
wherein on the fishing line catching portion or on the supporting member, a protrusion is provided at a left or right side or both the left and right sides of the support shaft portion in a width direction of the supporting member in a plan view where the fishing line catching portion and the supporting member overlap each other, and
wherein the protrusion is provided on a front side of the support shaft portion in a plan view where the fishing line catching portion and the supporting member overlap each other.

2. The line stopper for a fishing reel according to claim 1, wherein
the supporting member has an insertion opening for letting the support shaft portion be inserted therethrough, and a tip of the support shaft portion has a spring engaging portion with which a spring is engaged.

3. The line stopper for a fishing reel according to claim 1, wherein
the support shaft portion is connected to the supporting member with an adhesive or a screw.

4. The line stopper for a fishing reel according to claim 1, wherein
the supporting member has a concave portion formed on both the left and right sides of the support shaft portion in rear of the protrusion in a plan view where the fishing line catching portion and the supporting member overlap each other.

5. The line stopper for a fishing reel according to claim 4, wherein
one of the fishing line catching portion or the supporting member has another protrusion on the rear side of the support shaft portion in a plan view where the fishing line catching portion and the supporting member overlap each other.

6. The line stopper for a fishing reel according to claim 1, wherein
a recess for receiving the protrusion is formed in one of the fishing line catching portion or the supporting member that does not have the protrusion.

7. The line stopper for a fishing reel according to claim 1, wherein,
one of the fishing line catching portion or the supporting member has another protrusion on the rear side of the support shaft portion in a plan view where the fishing line catching portion and the supporting member overlap each other.

8. A line stopper installed in a fishing reel, comprising:
a fishing line catching portion; and
a supporting member disposed under the fishing line catching portion to lock a fishing line between the fishing line catching portion and the supporting member,
wherein the fishing line catching portion has a support shaft portion for connecting the fishing line catching portion with the supporting member,
wherein on the fishing line catching portion or on the supporting member, a protrusion is provided at a left or right side or both the left and right sides of the support shaft portion in a width direction of the supporting member in a plan view where the fishing line catching portion and the supporting member overlap each other, and
wherein the supporting member has a concave portion formed on both the left and right sides of the support shaft portion in rear of the protrusion in a plan view where the fishing line catching portion and the supporting member overlap each other.

9. The line stopper for a fishing reel according to claim 8, wherein the supporting member has an insertion opening for letting the support shaft portion be inserted therethrough, and a tip of the support shaft portion has a spring engaging portion with which a spring is engaged.

10. The line stopper for a fishing reel according to claim 8, wherein a recess for receiving the protrusion is formed in one of the fishing line catching portion or the supporting member that does not have the protrusion.

11. The line stopper for a fishing reel according to claim 8, wherein one of the fishing line catching portion or the supporting member has another protrusion on the rear side of the support shaft portion in a plan view where the fishing line catching portion and the supporting member overlap each other.

12. A line stopper installed in a fishing reel, comprising:
a fishing line catching portion; and
a supporting member disposed under the fishing line catching portion to lock a fishing line between the fishing line catching portion and the supporting member,
wherein the fishing line catching portion has a support shaft portion for connecting the fishing line catching portion with the supporting member,
wherein on the fishing line catching portion or on the supporting member, a protrusion is provided at a left or right side or both the left and right sides of the support shaft portion in a width direction of the supporting member in a plan view where the fishing line catching portion and the supporting member overlap each other, and
wherein a recess for receiving the protrusion is formed in one of the fishing line catching portion or the supporting member that does not have the protrusion.

13. The line stopper for a fishing reel according to claim 12, wherein the supporting member has an insertion opening for letting the support shaft portion be inserted therethrough, and a tip of the support shaft portion has a spring engaging portion with which a spring is engaged.

14. The line stopper for a fishing reel according to claim 12, wherein one of the fishing line catching portion or the supporting member has another protrusion on the rear side of the support shaft portion in a plan view where the fishing line catching portion and the supporting member overlap each other.

* * * * *